United States Patent [19]

Okada

[11] Patent Number: 5,850,040

[45] Date of Patent: Dec. 15, 1998

[54] MULTIAXIAL ACCELERATION SENSOR USING A PIEZOELECTRIC ELEMENT

[75] Inventor: Kazuhiro Okada, Ageo, Japan

[73] Assignee: Wacoh Corporation, Saitama, Japan

[21] Appl. No.: 640,787

[22] PCT Filed: Sep. 25, 1995

[86] PCT No.: PCT/JP95/01939

§ 371 Date: May 23, 1996

§ 102(e) Date: May 23, 1996

[87] PCT Pub. No.: WO96/10184

PCT Pub. Date: Apr. 4, 1996

[30] Foreign Application Priority Data

Sep. 28, 1994 [JP] Japan .................................. 6-258909

[51] Int. Cl.⁶ .................................................. G01P 15/00
[52] U.S. Cl. ..................... 73/504.04; 73/514.34
[58] Field of Search ............................ 73/504.02, 504.03,
73/504.04, 504.12, 504.13, 514.29, 514.33,
514.34, 862.042, 862.043; 310/329, 321

[56] References Cited

U.S. PATENT DOCUMENTS

| | | | |
|---|---|---|---|
| 4,950,914 | 8/1990 | Kurihara | 73/514.34 |
| 5,365,799 | 11/1994 | Okada . | |
| 5,392,658 | 2/1995 | Okada | 73/562.043 |
| 5,571,972 | 11/1996 | Okada | 73/862.043 |
| 5,625,145 | 4/1997 | Maeno | 73/504.12 |

FOREIGN PATENT DOCUMENTS 4-25714 of 0000 Japan .
5-26744 of 0000 Japan .

*Primary Examiner*—Christine K. Oda
*Attorney, Agent, or Firm*—Ladas & Parry

[57] ABSTRACT

Upper electrodes (A1 to A5) are disposed on an upper surface of a disk-shaped piezoelectric element (10). On a lower surface of the piezoelectric element (10), an annular groove to surround origin O is formed at position corresponding to the upper electrodes (A1 to A5). At the portion where the annular groove is formed, the piezoelectric element (10) includes a flexible portion formed so as to have thin thickness. When the peripheral portion of the piezoelectric element (10) is fixed to the casing, the central portion positioned within the annular groove functions as a weight caused to hang down from the flexible portion. On the lower surface of the piezoelectric element (10), a lower electrode (B) is formed. When force is applied to the weight by acceleration, the flexible portion is bent. As a result, predetermined charges are produced in the upper electrodes (A1 to A5) with the lower electrode (B) being as a reference potential. Accordingly, applied acceleration can be detected. When a predetermined a.c. signal is delivered between the lower electrode (B) and the upper electrodes (A1 to A5), the weight is oscillated in a predetermined direction. Accordingly, angular velocity can be detected on the basis of Coriolis force applied to the weight. Thus, simple sensor capable of detecting both acceleration and angular velocity in three dimensional directions can be realized.

22 Claims, 22 Drawing Sheets

OSCILLATION U

CORIOLIS FORCE

TYPE I

POLARITY OF CHARGES PRODUCED IN UPPER ELECTRODE

|     | FOR DETECTION OF fx | | FOR DETECTION OF fy | | FOR DETECTION OF fz |
| --- | --- | --- | --- | --- | --- |
|     | A1 | A2 | A3 | A4 | A5 |
| fx  | +  | −  | 0  | 0  | 0  |
| fy  | 0  | 0  | +  | −  | 0  |
| fz  | −  | −  | −  | −  | +  |

TYPE II

POLARITY OF CHARGES PRODUCED IN UPPER ELECTRODE

|  | FOR DETECTION OF fx | | FOR DETECTION OF fy | | FOR DETECTION OF fz |
|---|---|---|---|---|---|
|  | A1 | $\overline{A2}$ | A3 | $\overline{A4}$ | A5 |
| fx | + | + | 0 | 0 | 0 |
| fy | 0 | 0 | + | + | 0 |
| fz | − | + | − | + | + |

POLARITY OF CHARGES PRODUCED IN UPPER ELECTRODE

|     | FOR DETECTION OF fx | | FOR DETECTION OF fy | | FOR DETECTION OF fz | | | |
| --- | --- | --- | --- | --- | --- | --- | --- | --- |
|     | A41 | A42 | A43 | A44 | A45 | A46 | A47 | A48 |
| fx  | +   | −   | 0   | 0   | −   | +   | 0   | 0   |
| fy  | 0   | 0   | −   | +   | 0   | 0   | +   | −   |
| fz  | −   | −   | +   | +   | +   | +   | −   | −   |

POLARITY OF CHARGES PRODUCED IN UPPER ELECTRODE

|  | FOR DETECTION OF fx | | FOR DETECTION OF fy | | FOR DETECTION OF fz | | | |
|---|---|---|---|---|---|---|---|---|
|  | A41 | $\overline{A42}$ | $\overline{A43}$ | A44 | A45 | A46 | $\overline{A47}$ | $\overline{A48}$ |
| fx | + | + | 0 | 0 | − | + | 0 | 0 |
| fy | 0 | 0 | + | + | 0 | 0 | − | + |
| fz | − | + | − | + | + | + | + | + |

POLARITY OF CHARGES PRODUCED IN UPPER ELECTRODE

|    | FOR DETECTION OF fx | | FOR DETECTION OF fy | | FOR DETECTION OF fz | |
|----|-----|-----|-----|-----|-----|-----|
|    | A51 | A52 | A53 | A54 | A55 | A56 |
| fx | +   | −   | 0   | 0   | −   | +   |
| fy | 0   | 0   | −   | +   | 0   | 0   |
| fz | −   | −   | +   | +   | +   | +   |

POLARITY OF CHARGES PRODUCED IN UPPER ELECTRODE

|  | FOR DETECTION OF fx | | FOR DETECTION OF fy | | FOR DETECTION OF fz | |
|---|---|---|---|---|---|---|
|  | A61 | A62 | A63 | A64 | A65 | A66 |
| fx | + | − | 0 | 0 | 0 | 0 |
| fy | 0 | 0 | − | + | + | − |
| fz | − | − | + | + | − | − |

POLARITY OF CHARGES PRODUCED IN UPPER ELECTRODE

|  | FOR DETECTION OF fx | | FOR DETECTION OF fy | |
|---|---|---|---|---|
|  | A71 | A72 | A73 | A74 |
| fx | + | − | 0 | 0 |
| fy | 0 | 0 | − | + |
| fz | − | − | + | + |

MULTIAXIAL ACCELERATION SENSOR USING A PIEZOELECTRIC ELEMENT

TECHNICAL FIELD

This invention relates to an acceleration sensor using a piezoelectric element and, more particularly, to a sensor capable of detecting respective acceleration components along multiple axes and capable of detecting respective angular velocity components about these axes.

BACKGROUND ART

In the automobile industry and the machinery industry, etc., there has been increased demand for sensors capable of precisely detecting a physical quantity such as acceleration or angular velocity. Particularly, small sensors capable of detecting these physical quantities for two-dimensional or three-dimensional components are demanded.

As such small sensors, a novel sensor which has been developed by the same inventor as that of the present application has been disclosed in the Japanese Patent Application Laid Open No. 5-26744/1993 publication. In this novel sensor, plural sets of detection elements comprised of a piezoelectric element are prepared and these sets of detection elements are disposed on a flexible substrate. This novel sensor is of a structure in which a working body is attached on the flexible substrate so that when external force is applied to the working body, bending takes place in the flexible substrate. This bending is transmitted to the piezoelectric element, and charges corresponding to the bending are produced in the piezoelectric element. Thus, the applied external force is detected on the basis of such charges produced. This is the fundamental principle of the novel sensor. Since a way of bending changes in dependency upon the direction of the applied external force, an approach is employed to detect the state of charges produced with respect to plural piezoelectric elements disposed at predetermined respective positions, thereby making it possible to detect magnitude and direction of the applied force. Moreover, in the Japanese Patent Laid Open Application No. 7-43226/1995 a publication, a technology for permitting similar detection by lesser number of detection elements is disclosed.

On the other hand, in the International Laid Open No. WO94/23272 publication based on the Patent Cooperation Treaty, there is disclosed an angular sensor in which plural piezoelectric elements are similarly disposed on a flexible substrate to thereby detect angular velocity components about respective three-dimensional axes. This angular velocity sensor utilizes the principle that when an object is oscillated in the Y-axis direction in the state where angular velocity $\omega x$ about the X-axis is applied, Coriolis force is exerted in the Z-axis direction. Namely, an a.c. voltage is applied to a predetermined piezoelectric element disposed on the flexible substrate to oscillate the working body attached on the flexible substrate in the Y-axis direction. In this case, since when angular velocity $\omega x$ about the X-axis is applied, a Coriolis force is exerted on the working body in the Z-axis direction, the working body is caused to undergo displacement in the Z-axis direction. This displacement is detected by charges that the piezoelectric element produces to thereby indirectly detect the applied angular velocity $\omega x$.

In the case where acceleration components or angular velocity components with respect to three-dimensional directions are detected by a single sensor, the technologies which have been proposed until now are required to dispose a large number of electrodes at predetermined positions, resulting in the problem that the structure becomes complicated as a whole. In sensors of such complicated structure, there takes place the problem that miniaturization becomes difficult, so mass-productivity is poor.

SUMMARY OF THE INVENTION

In view of the above, an object of this invention is to provide an acceleration/angular velocity sensor using a piezoelectric element which is simple in structure, is suitable for miniaturization and mass-production, and is capable of detecting acceleration components and/or angular velocity components relating to multi-dimensional direction.

In order to attain such an object, the sensor according to this invention has features as described below.

(1) A first mode of this invention resides in an acceleration sensor using a piezoelectric element for detecting acceleration components in plural coordinate axis directions in an XYZ three-dimensional system, the sensor comprising a piezoelectric element in a plate form, five upper electrodes formed on an upper surface of the piezoelectric element and a lower electrode formed at a position facing the respective upper electrodes on a lower surface of the piezoelectric element, wherein an origin of the XYZ three-dimensional coordinate system is defined substantially at a central position of the upper surface of the piezoelectric element, wherein the piezoelectric element extends along an XY plane and includes a central portion around the origin, a flexible portion surrounding the central portion and a peripheral portion surrounding the flexible portion, so that said central portion and said peripheral portion are caused to undergo displacement relative to each other by bending of the flexible portion, wherein either one of the central portion and the peripheral portion is fixed to a sensor casing as a fixed portion, and the other is supported as a working portion in a state to be displaced by force applied in respective coordinate axis directions, and wherein the five upper electrodes are constituted with a first upper electrode formed in a negative region with respect to the X-axis and having a shape symmetrical with respect to the X-axis, a second upper electrode formed in a positive region with respect to the X-axis and having a shape symmetrical with respect to the X-axis, a third upper electrode formed in a negative region with respect to the Y-axis and having a shape symmetrical with respect to the Y-axis, a fourth upper electrode formed in a positive region with respect to the Y-axis and having a shape symmetrical with respect to the Y-axis and a fifth upper electrode formed in a region surrounding a periphery of the origin, at least each portion of these respective upper electrodes being located on the flexible portion, the acceleration sensor further comprising, force detecting means for detecting a force in a particular axis direction applied to the working portion on the basis of charges produced in the upper electrodes, and circuit means for outputting a detected value by the force detecting means with respect to the particular axis direction as an electric signal so as to carry out detection of acceleration in the particular axis direction.

(2) A second mode of this invention resides in an acceleration sensor using a piezoelectric element according to the first mode, wherein an annular groove to surround a periphery of the origin is formed at the lower surface of the piezoelectric element, a thickness of the portion where the annular groove is formed is caused to be thinner than the rest of the piezoelectric element and is used as the flexible portion.

(3) A third mode of this invention resides in an acceleration sensor using a piezoelectric element for detecting acceleration components in plural coordinate axis directions in an XYZ three-dimensional system, the sensor comprising a piezoelectric element in a plate form, five upper electrodes formed on an upper surface of the piezoelectric element, a lower electrode formed at a position facing the respective upper electrodes on a lower surface of the piezoelectric element and a strain generative body in a plate form for supporting the lower electrode from below, wherein an origin of the XYZ three-dimensional coordinate system is defined substantially at a central position of an upper surface of the strain generative body, wherein the strain generative body extends along an XY plane and includes a central portion around the origin, a flexible portion surrounding the flexible portion, so that said central portion and said peripheral portion are caused to undergo displacement relative to each other by bending of the flexible portion, wherein either one of the central portion and the peripheral portion is fixed to a sensor casing as a fixed portion, and the other is supported as a working portion in a state to be displaced by force applied in respective coordinate axis directions, wherein the upper surface of the strain generative body and a lower surface of the lower electrode or electrodes are fixed in such a state where a plate surface of the piezoelectric element is substantially in parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body, and wherein the five upper electrodes are constituted with a first upper electrode formed in a negative region with respect to the X-axis and having a shape symmetrical with respect to the X-axis, a second upper electrode formed in a positive region with respect to the X-axis and having a shape symmetrical with respect to the X-axis, a third upper electrode formed in a negative region with respect to the Y-axis and having a shape symmetrical with respect to the Y-axis, a fourth upper electrode formed in a positive region with respect to the Y-axis and having a shape symmetrical with respect to the Y-axis and a fifth upper electrode formed in a region surrounding a periphery of the origin, at least each portion of these respective upper electrodes being located on the flexible portion, said acceleration sensor further comprising, force detecting means for detecting a force in a particular axis direction applied to the working portion on the basis of charges produced in the upper electrodes, and circuit means for outputting a detected value by the force detecting means with respect to the particular axis direction as an electric signal so as to carry out detection of acceleration in the particular axis direction.

(4) A fourth mode of this invention resides in an acceleration sensor using a piezoelectric element according to the third mode, wherein at least an upper surface portion of the strain generative body is constituted by conductive material so that the lower electrode is constituted by the upper portion of the conductive material.

(5) A fifth mode of this invention resides in an acceleration sensor using a piezoelectric element according to the third or fourth mode, wherein an annular groove to surround a periphery of the origin is formed at a lower surface of the strain generative body, the thickness of the portion where the annular groove is formed is caused to be thinner than the other portions, and is used as a flexible portion.

(6) The sixth mode of this invention resides in an acceleration sensor using a piezoelectric element according to the first to fifth modes, wherein an inside annular region to surround the origin from a periphery thereof and an outside annular region to surround the inside annular region are defined on the XY plane, wherein the first upper electrode is disposed in a region extending over the second quadrant and the third quadrant of the XY coordinate system within the outside annular region, wherein the second upper electrode is disposed in a region extending over the first quadrant and the fourth quadrant of the XY coordinate system within the outside annular region, wherein the third upper electrode is disposed in a region extending over the third quadrant and the fourth quadrant of the XY coordinate system within the outside annular region, wherein the fourth upper electrode is disposed in a region extending over the first quadrant and the second quadrant of the XY coordinate system within the outside annular region, and wherein the fifth upper electrode is disposed within the inside annular region.

(7) A seventh mode of this invention resides in an acceleration sensor using a piezoelectric element according to the first to fifth modes, wherein an inside annular region to surround the origin from a periphery thereof and an outside annular region to surround the inside annular region are defined on the XY plane, wherein the first upper electrode is disposed in a region extending over the second quadrant and the third quadrant of the XY coordinate system within the inside annular region, wherein the second upper electrode is disposed in a region extending over the first quadrant and the fourth quadrant of the XY coordinate system within the inside annular region, wherein the third upper electrode is disposed in a region extending over the third quadrant and the fourth quadrant of the XY coordinate system within the inside annular region, wherein the fourth upper electrode is disposed in a region extending over the first quadrant and the second quadrant of the XY coordinate system within the inside annular region, and wherein the fifth upper electrode is disposed within the outside annular region.

(8) An eighth mode of this invention resides in an acceleration sensor using a piezoelectric element according to the first to seventh modes, wherein polarization processing is carried out with respect to respective portions of the piezoelectric element, so that polarization characteristics opposite each other are respectively obtained at a portion of the piezoelectric element where the first upper electrode is formed and a portion of the piezoelectric element where the second upper electrode is formed, and so that polarization characteristics opposite each other are respectively obtained at a portion of the piezoelectric element where the third upper electrode is formed and a portion of the piezoelectric element where the fourth electrode is formed.

(9) A ninth mode of this invention resides in an acceleration sensor using a piezoelectric element according to the first to eighth modes, wherein the sensor further comprises excitation means for applying an a.c. voltage across a predetermined pair of upper and lower electrodes to thereby oscillate the working portion in a first axis direction, and wherein the circuit means has the function to output a detected value by the force detecting means with respect to a second axis direction perpendicular to the first axis direction as an electric signal so as to carry out detection of an angular velocity about a third axis perpendicular to the first axis and the second axis, thus making it possible to detect angular velocity components about plural coordinate axes along with acceleration components in plural coordinate axis directions.

(10) A tenth mode of this invention resides in an acceleration sensor using a piezoelectric element according to the ninth mode, wherein there are provided three excitation means consisting of, X-axis direction excitation means for applying an a.c. voltage across the first upper and lower electrodes and across the second upper and lower electrodes to thereby oscillate the working portion in the X-axis direction, Y-axis direction excitation means for applying an a.c. voltage across the third upper and lower electrodes and across the fourth upper and lower electrodes to thereby oscillate the working portion in the Y-axis direction, and Z-axis direction excitation means for applying an a.c. voltage across the fifth upper and lower electrodes to thereby oscillate the working portion in the Z-axis direction, and wherein there are provided three force detecting means consisting of, X-axis direction force detecting means for detecting a force in the X-axis direction applied to the working portion, on the basis of charges produced in the first upper electrode and charges produced in the second upper electrode, Y-axis direction force detecting means for detecting a force in the Y-axis direction applied to the working portion, on the basis of charges produced in the third upper electrode and charges produced in the fourth upper electrode, and Z-axis direction force detecting means for detecting a force in the Z-axis direction applied to the working portion, on the basis of charges produced in the fifth upper electrode.

(11) An eleventh mode of this invention resides in an acceleration sensor using a piezoelectric element for detecting acceleration components in plural coordinate axis directions in an XYZ three-dimensional coordinate system, the sensor comprising a piezoelectric element in a plate form, five upper electrodes formed on an upper surface of the piezoelectric element and a lower electrode formed at a position facing the respective upper electrodes on a lower surface of the piezoelectric element, wherein an origin of the XYZ three-dimensional coordinate system is defined substantially at a central position of the upper surface of the piezoelectric element, wherein the piezoelectric element extends along an XY plane and includes a central portion around the origin, a flexible portion surrounding the central portion and a peripheral portion surrounding the flexible portion, so that said central portion and said peripheral portion are caused to undergo displacement relative to each other by bending of the flexible portion, wherein either one of the central portion and the peripheral portion is fixed to a sensor casing as a fixed portion, and the other is supported as a working portion in a state to be displaced by force applied in respective coordinate axis directions, and wherein the five upper electrodes are constituted as a first upper electrode disposed in the first quadrant of the XY coordiante system, a second upper electrode disposed in the second quadrant thereof, a third upper electrode disposed in the third quadrant thereof, a fourth upper electrode disposed in the fourth quadrant thereof and a fifth upper electrode disposed in a peripheral region of the origin, at least each portion of these respective upper electrodes being located on the flexible portion, the acceleration sensor further comprising, force detecting means for detecting a force in a particular axis direction applied to the working portion on the basis of charges produced in the upper electrodes, and circuit means for outputting a detected value by the force detecting means with respect to the particular axis direction as an electric signal so as to carry out detection of acceleration in the particular axis direction.

(12) A twelfth mode of this invention resides in an acceleration sensor using a piezoelectric element for detecting acceleration components in plural coordinate axis directions in an XYZ three-dimensional coordinate system, the sensor comprising a piezoelectric element in a plate form, five upper electrodes formed on an upper surface of the piezoelectric element, a lower electrode formed at a position facing the respective upper electrodes on a lower surface of the piezoelectric element and a strain generative body in a plate form for supporting the lower electrode or electrodes from below, wherein an origin of the XYZ three-dimensional coordinate system is defined substantially at a central position of an upper surface of the strain generative body, wherein the strain generative body extends along an XY plane and includes a central portion around the origin, a flexible portion surrounding the central portion and a peripheral portion surrounding the flexible portion, so that said central portion and said peripheral portion are caused to undergo displacement relative to each other by bending of the flexible portion, wherein either one of the central portion and the peripheral portion is fixed to a sensor casing as a fixed portion, and the other is supported as a working portion in a state to be displaced by force applied in respective coordinate axis directions, wherein the upper surface of the strain generative body and a lower surface of the lower electrode are fixed in such a state where a plate surface of the piezoelectric element is substantially parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body, and wherein the five upper electrodes are constituted with a first upper electrode disposed in the first quadrant of the XY coordinate system, a second upper electrode disposed in the second quadrant thereof, a third upper electrode disposed in the third quadrant thereof, a fourth upper electrode disposed in the fourth quadrant thereof and a fifth upper electrode disposed in a peripheral region of the origin, at least each portion of these respective upper electrodes being located on the flexible portion, the acceleration sensor further comprising, force detecting means for detecting a force in a particular axis direction applied to the working portion on the basis of charges produced in the upper electrodes, and circuit means for outputting a detected value by the force detecting means with respect to the particular axis direction as an electric signal so as to carry out detection of acceleration in the particular axis direction.

(13) A thirteenth mode of this invention resides in an acceleration sensor using a piezoelectric element according to the above-described respective modes, wherein eight upper electrodes are used in place of the upper electrodes in the above-described modes, and these eight upper electrodes are constituted as, a first upper electrode formed in a negative region with respect to the X-axis, having a shape symmetrical with respect to the X-axis, and disposed within an outside annular region, a second upper electrode formed in a positive area with respect to the X-axis, having a shape symmetrical with respect to the X-axis, and disposed within the outside annular region, a third upper electrode formed in a negative region with respect to the Y-axis, having a shape symmetrical with respect to the Y-axis, and disposed within an inside annular region, a fourth upper electrode formed in a positive region with respect to the Y-axis, having a shape symmetrical with respect to the Y-axis, and disposed within the inside annular region, a fifth upper electrode formed in the negative region with respect to the X-axis, having a shape symmetrical with respect to the X-axis, and disposed within the inside annular region, a sixth upper electrode formed in the positive region with respect to the X-axis, having a shape symmetrical with respect to the X-axis, and disposed within the inside annular region, a seventh upper electrode formed in the negative region with respect to the Y-axis, having a shape symmetrical with respect to the Y-axis, and disposed within the outside annular region, and an eighth upper electrode formed in the positive region with respect to the Y-axis, having a shape symmetrical with respect to the Y-axis, at least one portion of each of these respective upper electrodes being formed in the flexible portion.

(14) A fourteenth mode of this invention resides in an acceleration sensor using a piezoelectric element according to the above-described respective modes, wherein six upper electrodes are used in place of the upper electrodes in the above-described modes, and these six upper electrodes are constituted as, a first upper electrode formed in a negative region with respect to the X-axis, having a shape symmetrical with respect to the X-axis, and disposed within an outside annular region, a second upper electrode formed in a positive area with respect to the X-axis, having a shape symmetrical with respect to the X-axis, and disposed within the outside annular region, a third upper electrode formed in a negative region with respect to the Y-axis, having a shape symmetrical with respect to the Y-axis, and disposed within an inside annular region, a fourth upper electrode formed in a positive region with respect to the Y-axis, having a shape symmetrical with respect to the Y-axis, and disposed within the inside annular region, a fifth upper electrode formed in the negative region with respect to the X-axis, having a shape symmetrical with respect to the X-axis, and disposed within the inside annular region, and a sixth upper electrode formed in the positive region with respect to the X-axis, having a shape symmetrical with respect to the X-axis, and disposed within the inside annular region, at least one portion of each of these respective upper electrodes being formed in the flexible portion.

(15) A fifteenth mode of this invention resides in an acceleration sensor using a piezoelectric element according to the above-described respective modes, wherein six upper electrodes are used in place of the upper electrodes in the above-described modes, and these six upper electrodes are constituted as, a first upper electrode formed in a negative region with respect to the X-axis, having a shape symmetrical with respect to the X-axis, and disposed within an outside annular region, a second upper electrode formed in a positive area with respect to the X-axis, having a shape symmetrical with respect to the X-axis, and disposed within the outside annular region, a third upper electrode formed in a negative region with respect to the Y-axis, having a shape symmetrical with respect to the Y-axis, and disposed within an inside annular region, a fourth upper electrode formed in a positive region with respect to the Y-axis, having a shape symmetrical with respect to the Y-axis, and disposed within the inside annular region, a fifth upper electrode formed in the negative region with respect to the Y-axis, having a shape symmetrical with respect to the Y-axis, and disposed within the outside annular region, and an sixth upper electrode formed in the positive region with respect to the Y-axis, having a shape symmetrical with respect to the Y-axis, at least one portion of each of these respective upper electrodes being formed in the flexible portion.

(16) A sixteenth mode of this invention resides in an acceleration sensor using a piezoelectric element according to the above-described respective modes, wherein four upper electrodes are used in place of the upper electrodes in the above-described modes, and these four upper electrodes are constituted as, a first upper electrode formed in a negative region with respect to the X-axis, having a shape symmetrical with respect to the X-axis, and disposed within an outside annular region, a second upper electrode formed in a positive area with respect to the X-axis, having a shape symmetrical with respect to the X-axis, and disposed within the outside annular region, a third upper electrode formed in a negative region with respect to the Y-axis, having a shape symmetrical with respect to the Y-axis, and disposed within an inside annular region, and a fourth upper electrode formed in a positive region with respect to the Y-axis, having a shape symmetrical with respect to the Y-axis, and disposed within the inside annular region, at least one portion of each of these respective upper electrodes being formed in the flexible portion.

In a sensor according to this invention, a flexible portion is provided in a piezoelectric element itself or a strain generative body which is connected to a piezoelectric element. By providing such a flexible portion, a central portion surrounded by the flexible portion and a peripheral portion of the periphery of the flexible portion are caused to undergo displacement mutually or relative to each other by bending of the flexible portion. Accordingly, in the case where the central portion is fixed, the peripheral portion functions as a weight. When acceleration is applied, bending takes place in the flexible portion. In contrast, in the case where the peripheral portion is fixed, the central portion functions as a weight. When acceleration is applied, bending similarly takes place in the flexible portion. Eventually, bending takes place in the piezoelectric element by application of acceleration. Thus, charges of specific polarity are produced in specific upper electrodes. By detecting the charges produced in this way, it is possible to measure the direction and magnitude of the applied acceleration.

On the other hand, when a predetermined a.c. voltage is applied across a specific pair of upper and lower electrodes, specific bending takes place within the piezoelectric element. As a result, the portion functioning as a weight is oscillated in a predetermined direction as an oscillator. Meanwhile, it is known that when angular velocity about the second axis is applied to the oscillator in the state where the oscillator is oscillated in the first axis direction, Coriolis force in the third axis direction is produced in this oscillator. This Coriolis force allows the piezoelectric element to produce another bending. As a result, charges of specific polarity are produced in specific upper electrodes. By detecting charges produced in this way, it becomes possible to measure the direction and magnitude of the applied angular velocity.

The sensor according to this invention is of a simple structure composed of a piezoelectric element in a plate form, plural upper electrodes disposed on the upper surface thereof, and a single common lower electrode provided on the lower surface of the piezoelectric element in a manner opposite thereto, but it can detect all acceleration components in respective axis directions and angular velocity components about respective axes in the XYZ three-dimensional coordinate system on the basis of the above-described principle. Thus, in accordance with this invention, it becomes possible to realize an acceleration/angular velocity sensor which is simple in structure, is suitable for miniaturization and mass-productivity, and capable of detecting both acceleration and angular velocity relating to the three dimensional directions.

DETAILED DESCRIPTION OF THE INVENTION

Best Mode for Carrying Out Invention

§1 Fundamental principle of detection of angular velocity and acceleration

Figure 1:
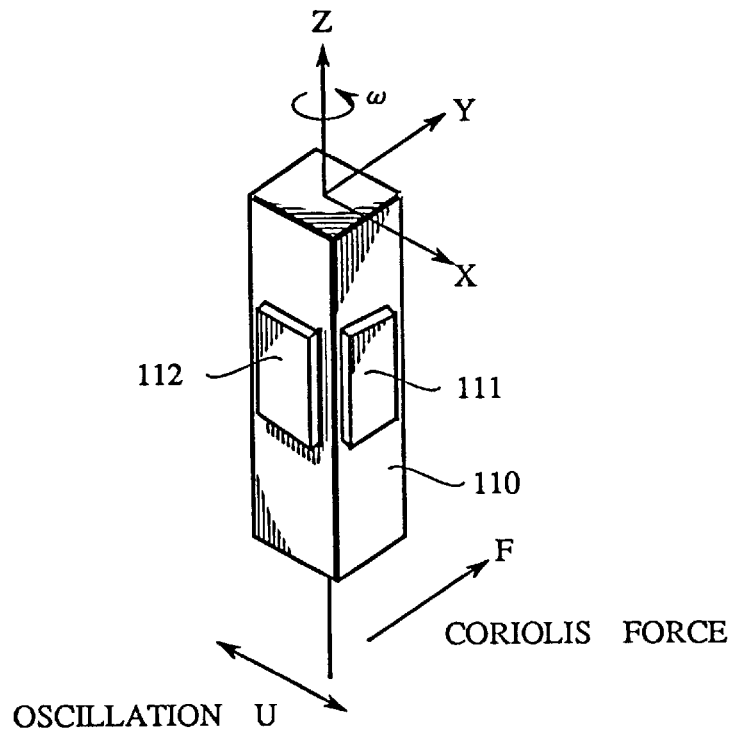
FIG. 1 is a perspective view showing the fundamental principle of a one-dimensional angular velocity sensor utilizing a Coriolis force.

The fundamental principle of detection of angular velocity in a sensor according to this invention will be first described. A sensor according to this invention can detect angular velocity about two axes or three axes. Initially, the principle of uni-axial angular velocity detection will be briefly described below. FIG. 1 is a view showing the fundamental principle of an angular velocity sensor disclosed on page 60 of the Japanese Magazine "THE INVENTION", vol. 90, No. 3 (1993). Now, an oscillator 110 in square pillar form is prepared to suppose an XYZ three-dimensional coordinate system in which the X, Y, Z axes are defined in the directions as shown. It is known that in the case where the oscillator 110 is carrying out rotational movement at angular velocity ω with the Z-axis being an axis of rotation in such a system, a phenomenon as described below takes place. Namely, when this oscillator 110 is caused to undergo such an oscillation U to reciprocate it in the X-axis direction, a Coriolis force F is produced in the Y-axis direction. In other words, when the oscillator 110 is rotated with the Z-axis as a center of rotation in the state where the oscillator 110 is oscillated along the X-axis of the figure, Coriolis force F is produced in the Y-axis direction. This phenomenon is a phenomenon known as Foucault's pendulum, and the produced Coriolis force F is expressed as follows:

$$F = 2m \cdot v \cdot \omega.$$

In the above relational expression, m is mass of the oscillator 110, v is instantaneous velocity with respect to oscillation of the oscillator 110, and ω is instantaneous angular velocity of the oscillator 110.

The uni-axial angular velocity sensor disclosed in the previously described magazine detects angular velocity ω by using such a phenomenon. Namely, as shown in FIG. 1, a first piezoelectric element 111 is attached on the first plane surface of the oscillator 110 in square pillar form, and a second piezoelectric element 112 is attached on the second plane surface perpendicular to the first plane surface. The piezoelectric elements 111, 112 are elements in a plate form comprised of piezoelectric ceramic. Further, in order to allow the oscillator 110 to undergo oscillation U, the piezoelectric element 111 is utilized and in order to detect Coriolis force F, the piezoelectric element 112 is utilized. Namely, when a.c. voltage is applied to the piezoelectric element 111, this piezoelectric element 111 repeats a reciprocating movement to oscillate in the X-axis direction. This oscillation U is transmitted to the oscillator 110. Thus, the oscillator 110 is oscillated in the X-axis direction. When the oscillator 110 itself is rotated at angular velocity ω with the Z-axis being a center axis in the state where the oscillator 110 is caused to undergo oscillation U, a Coriolis force is produced in the Y-axis direction by the above-described phenomenon. Since this Coriolis force F is exerted in the thickness direction of the piezoelectric element 112, voltage V proportional to the Coriolis force F is produced across both the surfaces of the piezoelectric element 112. In view of the above, by measuring such voltage V, it becomes possible to detect angular velocity ω.

Figure 2:
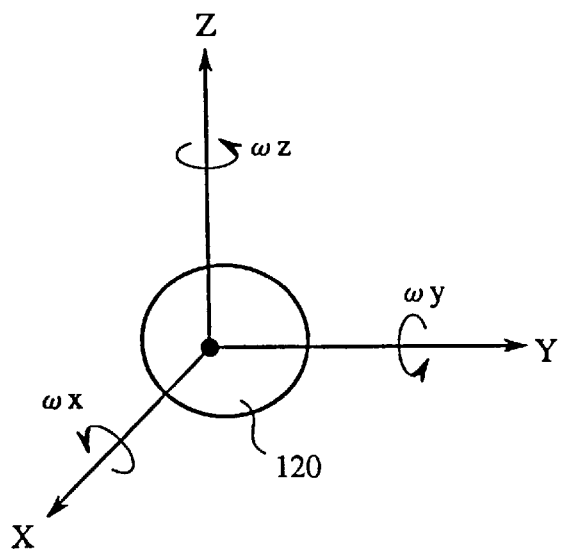
FIG. 2 is a view showing angular velocity components about respective axes in the XYZ three-dimensional coordinate system to be detected in the angular velocity sensor.
Figure 3:
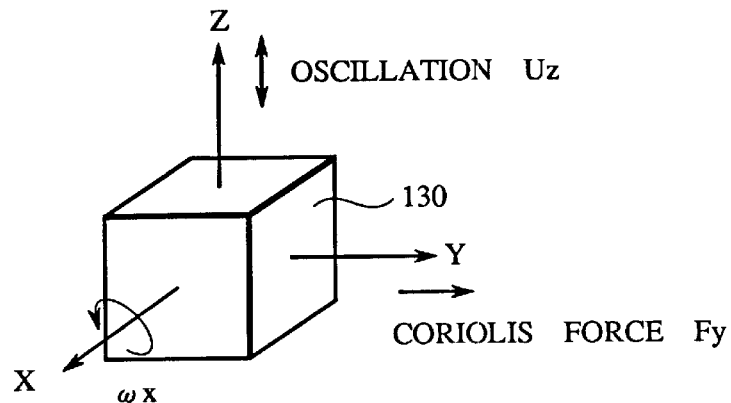
FIG. 3 is a view for explaining the fundamental principle for detecting angular velocity $\omega x$ about the X-axis by using a sensor according to this invention.
Figure 4:
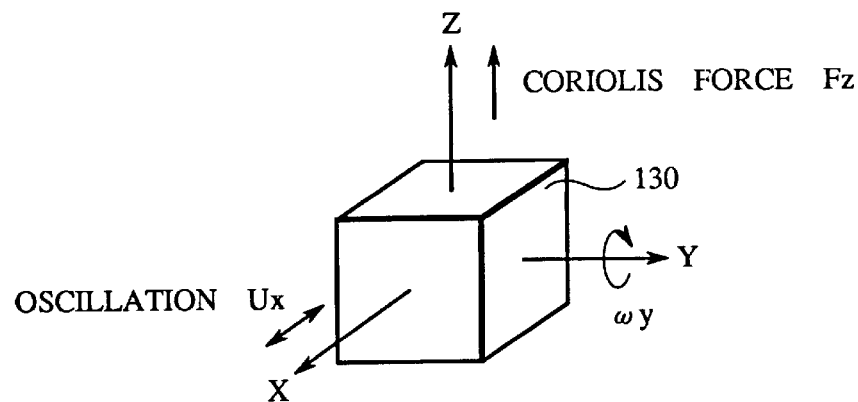
FIG. 4 is a view for explaining the fundamental principle for detecting angular velocity $\omega y$ about the Y-axis by using a sensor according to this invention.
Figure 5:
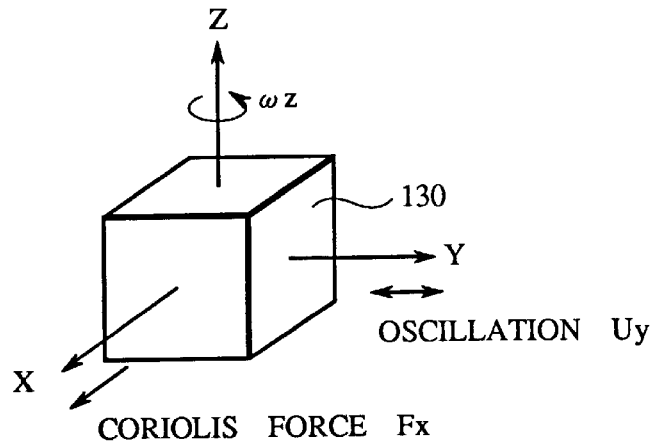
FIG. 5 is a view for explaining the fundamental principle for detecting angular velocity $\omega z$ about the Z-axis by using a sensor according to this invention.

The above-described conventional angular velocity sensor is a sensor for detecting angular velocity about the Z-axis, therefore it can not detect angular velocity about the X-axis or the Y-axis. In the sensor according to this invention, as shown in FIG. 2, it is possible to respectively independently detect angular velocity ωx about the X-axis, angular velocity ωy about the Y-axis and angular velocity ωz abut the Z-axis in the XYZ three-dimensional coordinate system. The fundamental principle thereof will now be described with reference to FIGS. 3 to 5. It is now assumed that an oscillator 130 is placed at a position of origin of the XYZ three-dimensional coordinate system. In order to detect angular velocity ωx about the X-axis of the oscillator 130, it is sufficient to measure Coriolis force Fy produced in the Y-axis direction when the oscillator 130 is caused to undergo oscillation Uz in the Z-axis direction as shown in FIG. 3. The Coriolis force Fy becomes equal to a value proportional to the angular velocity ωx. Moreover, in order to detect angular velocity ωy about the Y-axis of the oscillator 130, it is sufficient to measure Coriolis force Fz produced in the Z-axis direction when the oscillator 130 is caused to undergo oscillation Ux in the X-axis direction as shown in FIG. 4. The Coriolis force Fz becomes equal to a value proportional to angular velocity ωy. Further, in order to detect angular velocity ωz about the Z-axis of the oscillator 130, it is sufficient to measure Coriolis force Fx produced in the X-axis direction when the oscillator 130 is caused to undergo oscillation Uy in the Y-axis direction as shown in FIG. 5. The Coriolis force Fx becomes equal to a value proportional to angular velocity ωz.

Figure 6:
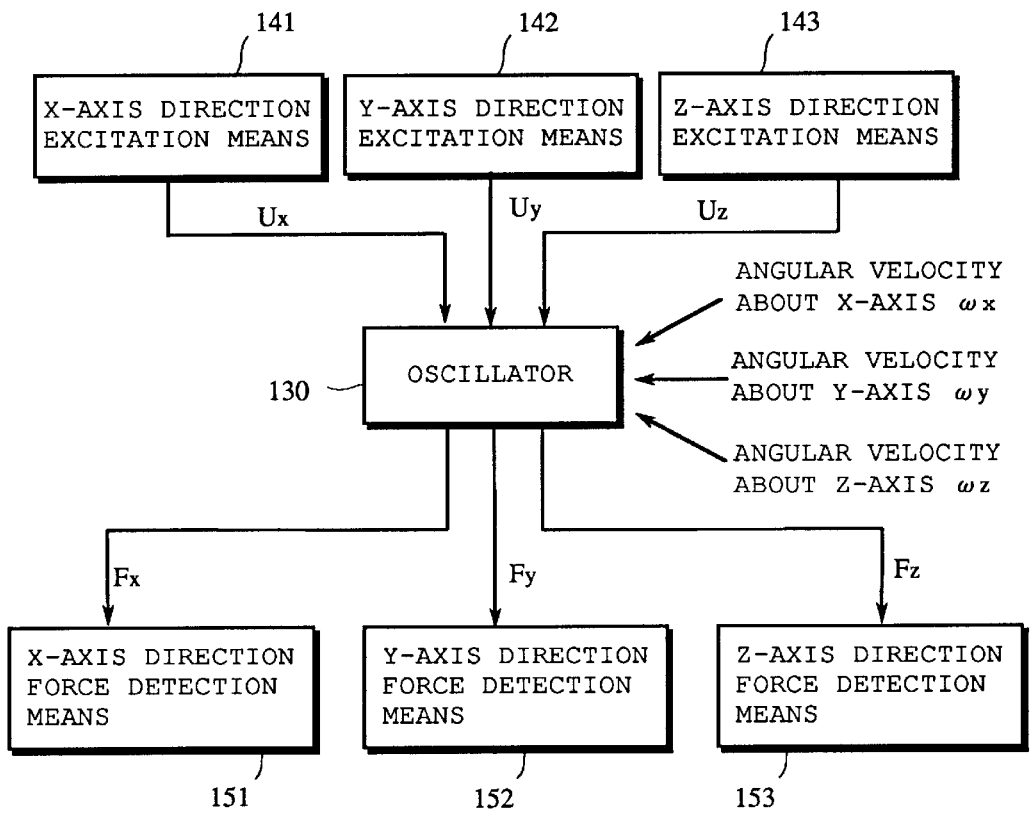
FIG. 6 is a block diagram showing components for carrying out detection of angular velocity in a sensor according to this invention.

Eventually, in order to respectively detect angular velocity ωx about the X-axis, angular velocity ωy about the Y-axis and angular velocity ωz about the Z-axis in the XYZ three-dimensional coordinate system, it is sufficient, as shown in FIG. 6, to prepare X-axis direction excitation means (oscillation energy supply means) 141 for allowing the oscillator 130 to undergo oscillation Ux in the X-axis direction, Y-axis direction excitation means (oscillation energy supply means) 142 for allowing it to undergo oscillation Uy in the Y-axis direction and Z-axis direction excitation means (oscillation energy supply means) 143 for allowing it to undergo oscillation Uz in the Z-axis direction, and to prepare X-axis direction force detecting means 151 for detecting Coriolis force Fx in the X-axis direction applied to the oscillator 130, Y-axis direction force detecting means 152 for detecting Coriolis force Fy in the Y-axis direction and Z-axis force detecting means 153 for detecting Coriolis force Fz in the Z-axis direction.

On the other hand, the principle of detection of acceleration is more simple. Namely, when acceleration α in a predetermined direction is applied to an oscillator (functioning as merely a weight having mass m) in a stationary state, a force expressed as f=m·α is applied in the same direction as that of the acceleration α. Accordingly, if force components fx, fy, fz in respective axes directions applied to the oscillator 130 in the stationary state are detected, acceleration components αx, αy, αz in respective directions can be detected by calculations using mass m.

Figure 7:
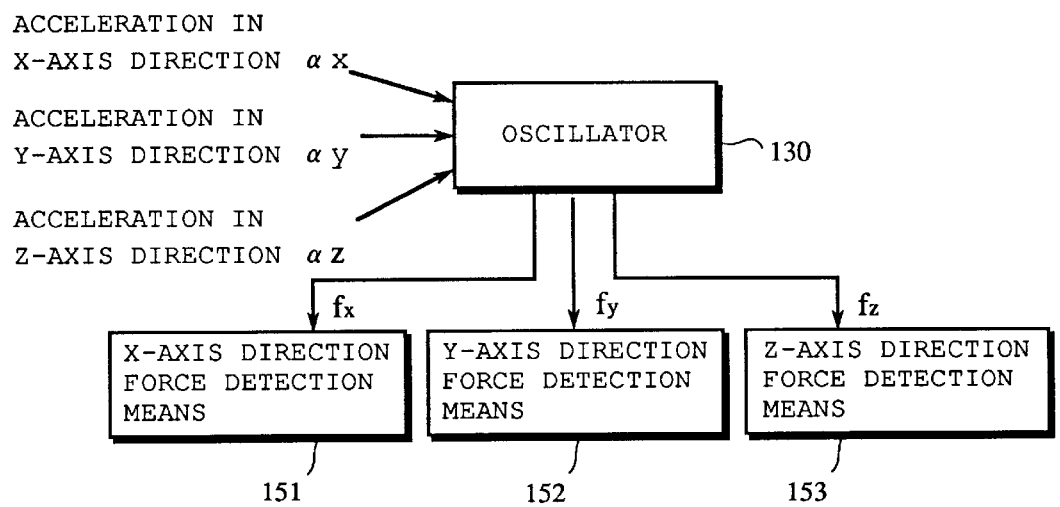
FIG. 7 is a block diagram showing components for carrying out detection of acceleration in a sensor according to this invention.

Eventually, in order to respectively detect acceleration αx in the X-axis direction, acceleration αy in the Y-axis direction and acceleration αz in the Z-axis direction in the XYZ three-dimensional coordinate system, it is sufficient, as shown in FIG. 7, to provide X-axis direction force detecting means 151 for detecting force fx in the X-axis direction applied to the oscillator 130, Y-axis direction force detecting means 152 for detecting force fy in the Y-axis direction and Z-axis direction force detecting means 153 for detecting force fz in the Z-axis direction.

The components of the three-dimensional angular velocity sensor is shown as a block diagram in FIG. 6 and the components of the three-dimensional acceleration sensor is shown as a block diagram in FIG. 7. When comparison therebetween is made, it is understood that the former configuration includes the latter configuration. Namely, if excitation means 141, 142, 143 for respective axes directions are further added to the acceleration sensor shown in FIG. 7, the angular velocity sensor shown in FIG. 6 is obtained. The angular velocity sensor shown in FIG. 6 also functions as the acceleration sensor shown in FIG. 7.

§2 Structure of the sensor according to the fundamental embodiment

The sensor according to this invention serves to detect acceleration components in respective axes directions and angular velocity components about respective axes of the XYZ three-dimensional coordinate system on the basis of the above-described fundamental principle. An example of a more practical structure will be described below in accordance with the fundamental embodiment.

Figure 8:
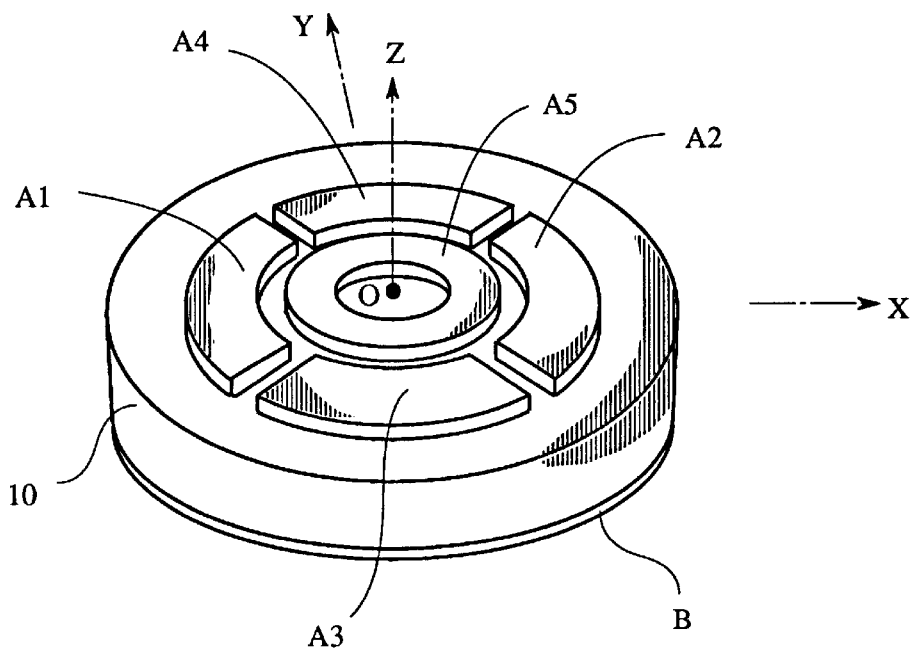
FIG. 8 is a perspective view when a sensor according to the fundamental embodiment of this invention is viewed from an oblique upper direction.
Figure 9:
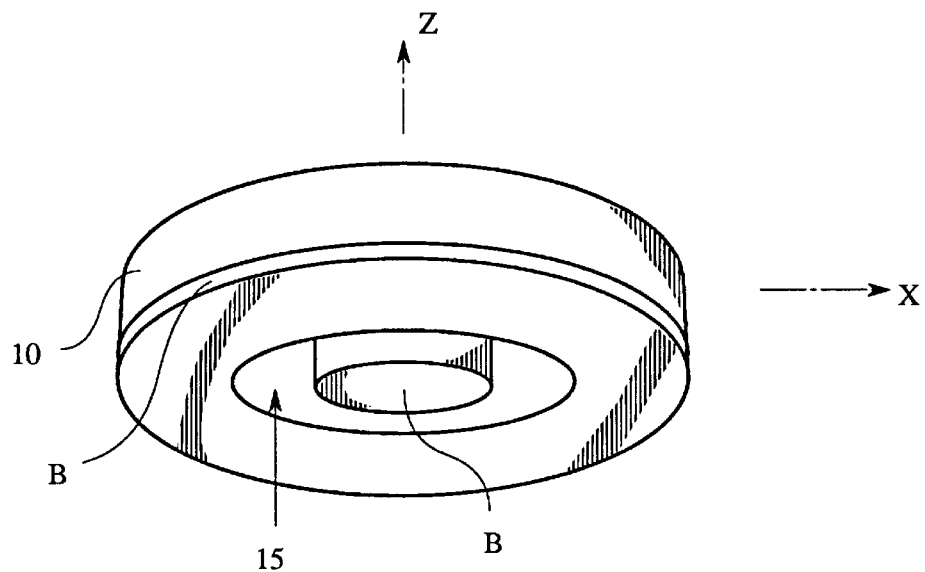
FIG. 9 is a perspective view when the sensor shown in FIG. 8 is viewed from an oblique lower direction.

FIG. 8 is a perspective view when the sensor according to the fundamental embodiment is viewed from an oblique upper direction and FIG. 9 is a perspective view when the sensor is viewed from an oblique lower direction. In this sensor, five upper electrodes A1 to A5 are formed on an upper surface of a disk-shaped piezoelectric element 10 and a single lower electrode B is formed on a lower surface. For convenience of explanation, origin O of the XYZ three-dimensional coordinate system is defined at the central position of the upper surface of the disc-shaped piezoelectric element 10, X-axis and Y-axis are defined in directions along the upper surface of the piezoelectric element 10 and Z-axis is defined in a direction toward the upper direction perpendicular to the upper surface. Accordingly, the upper surface of the piezoelectric element 10 is included in the XY plane.

The structural feature of the piezoelectric element 10 resides in that an annular groove 15 is formed at the lower surface as shown in FIG. 9. In this embodiment, the annular groove 15 has the shape of a circle surrounding the origin O. The lower electrode B is a single electrode layer and is formed on the entirety of the lower surface of the piezoelectric element 10 including the interior of the annular groove 15 as well.

Figure 10:
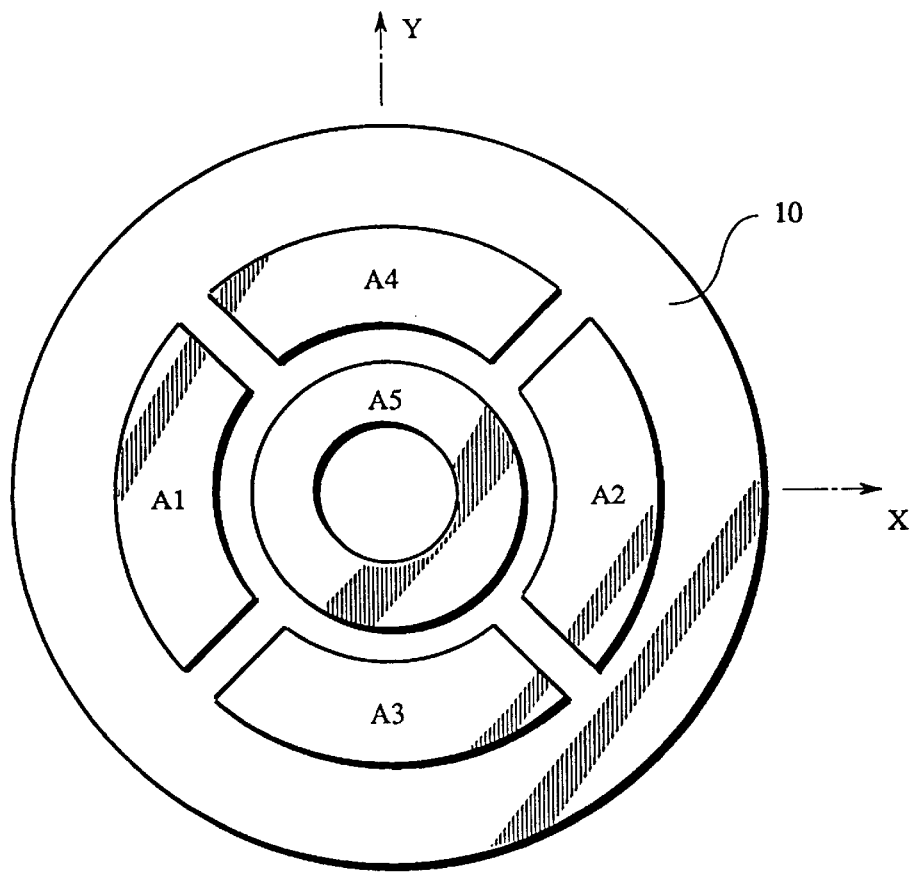
FIG. 10 is a top view of the sensor shown in FIG. 8.

On the other hand, as clearly illustrated in the top view of FIG. 10, the upper electrodes A1 to A4 are all belt shaped along a circular arc with the origin O being a center and having a shape symmetrical with respect to the X-axis or the Y-axis. Namely, when the XY-plane is defined on the upper surface of the piezoelectric element 10, the upper electrode A1 is disposed in the region extending over the second quadrant and the third quadrant of the XY coordinate system so as to have a shape symmetrical with respect to the X-axis in the negative region with respect to the X-axis, the upper electrode A2 is disposed in the region extending over the first quadrant and the fourth quadrant of the XY coordinate system so as to have a shape symmetrical with respect to the X-axis in the positive region with respect to the X-axis, the upper electrode A3 is disposed in the region extending over the third quadrant and the fourth quadrant of the XY coordinate system so as to have a shape symmetrical with respect to the Y-axis in the negative region with respect to the Y-axis, and the upper electrode A4 is disposed in the region extending over the first quadrant and the second quadrant of the XY coordinate system so as to have a shape symmetrical with respect to the Y-axis in the positive region with respect to the Y-axis. In addition, the upper electrode A5 symmetrically surrounds the origin O, such that origin 10 form a center electrode A5. In a more practical sense, the upper electrode A5 is a so called washer-shaped electrode having such an annular structure to surround the origin O. However, it is not necessarily required that the upper electrode A5 be washer-shaped, and it may be a disk-shaped electrode in which the opening portion in the center is filled. In addition, the reason why the upper electrode A5 symmetrically surrounds the origin is to realize the state where no interference of other axes components takes place when force components in respective coordinate axes directions are detected as described later. If such a shape which is free from interference of other axes components can be realized, it is not necessarily required that the upper electrode A5 be symmetrical around the origin.

Figure 11:
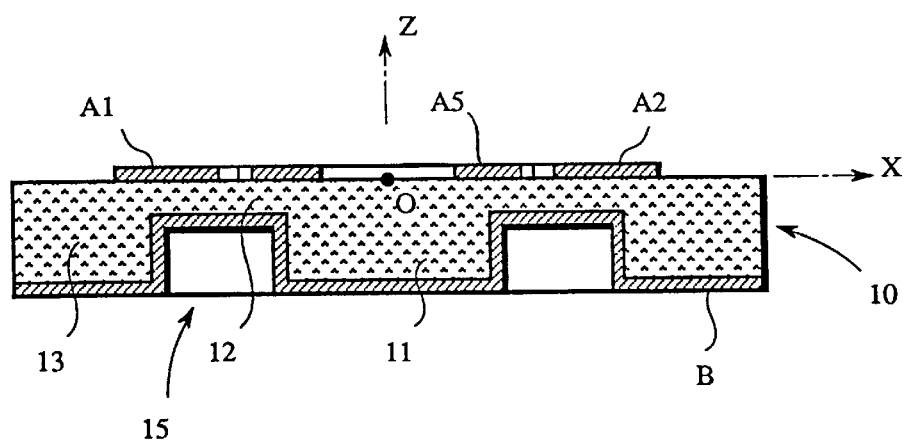
FIG. 11 is a side cross sectional view in which the sensor shown in FIG. 8 is cut along the XY plane.
Figure 12:
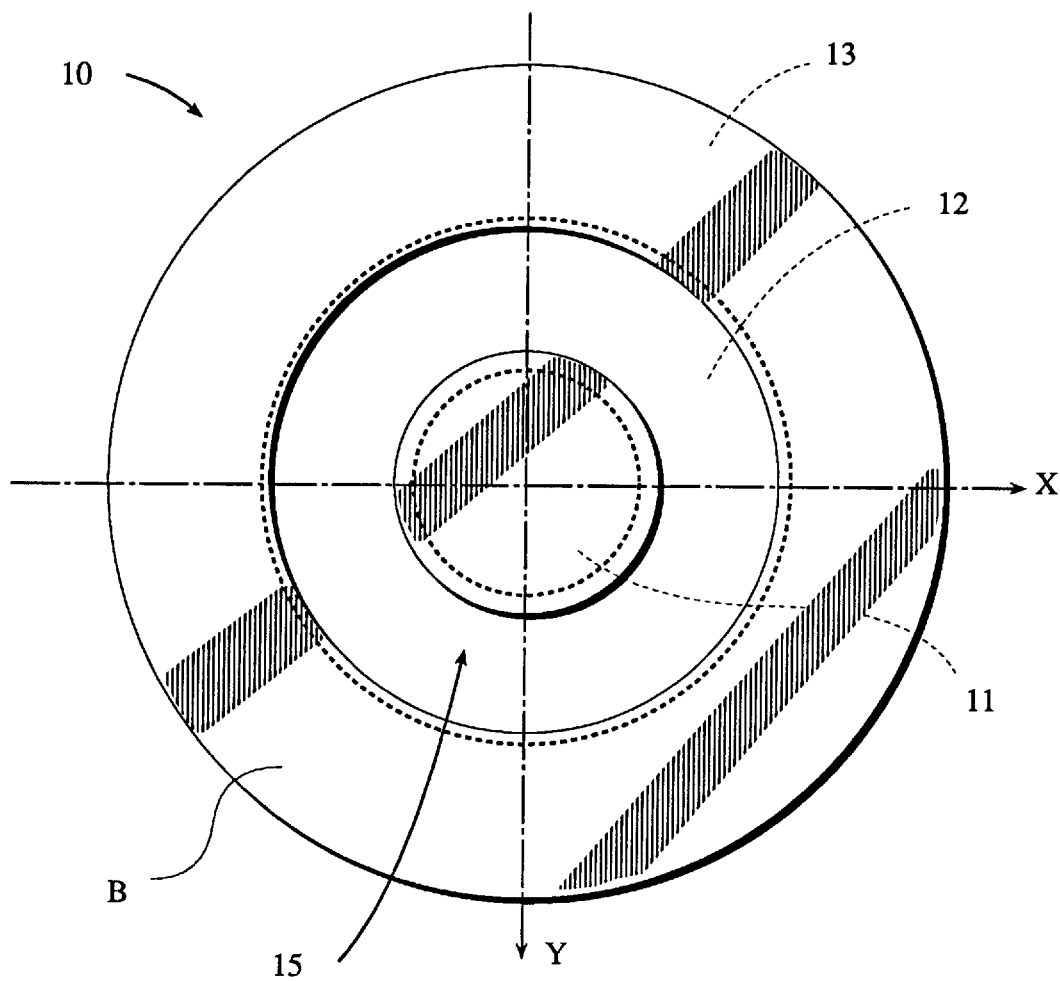
FIG. 12 is a bottom view of the sensor shown in FIG. 8.

When reference is made to FIG. 11, the structure of this sensor is made more clear. FIG. 11 is a side cross sectional view cut along the XZ plane of this sensor. The portion where the annular groove 15 is formed in the piezoelectric element 10 is thin as compared to other portions, and therefore has flexibility. In this example, it is assumed that the portion positioned above the annular groove 15 within the piezoelectric element 10 is called a flexible portion 12, the central portion surrounded (encompassed) by the flexible portion 12 is called a central portion 11, and the portion positioned at the outer periphery of the flexible portion 12 is called a peripheral portion 13. The relative positional relationship of these three portions is clearly shown in the bottom view of FIG. 12. Namely, the flexible portion 12 is formed at a portion where the annular groove 15 is formed at the periphery of the central portion 11, and the peripheral portion 13 is formed at the periphery of the flexible portion 12.

Supposing that only the peripheral portion 13 is fixed to a sensor casing and the entirety of the sensor casing is moved, a force based on acceleration is applied to the central portion 11 by the mass thereof so that bending takes place in the flexible portion 12 by this force. Namely, the central portion 11 is placed in the state supported from the periphery by the flexible portion 12 having flexibility. Thus, displacement can be produced to some degree in the X-axis, Y-axis and the Z-axis directions. Eventually, the central portion 11 in this sensor functions as the oscillator 130 having mass in the sensor shown in FIG. 6.

It is to be noted that, as shown in the side cross sectional view of FIG. 11, five upper electrodes A1 to A5 are all formed substantially on the upper surface of the flexible portion 12. The reason why such electrode arrangement is employed is as follows. As described later, the fundamental functions required for the upper electrodes A1 to A5 consists of two functions as follows. The first function is to produce charges on the basis of bending produced in the flexible portion 12 and the second function is to apply a predetermined a.c. voltage to the flexible portion 12 to thereby produce oscillation. In order to efficiently perform these two functions, it is preferable to form these upper electrodes A1 to A5 on the flexible portion 12. Of course, it is sufficient that at least a portion of respective upper electrodes exists in a region on the flexible portion 12. Actually, in this sensor of the fundamental embodiment, a portion of respective upper electrodes A1 to A5 is positioned on the flexible portion 12, but another portion is protruded from the region on the flexible portion 12. Similarly, it is not necessarily required that the upper electrode A5 be washer-shaped as described above, but it is sufficient to adopt a structure such that at least a portion thereof exists on the flexible portion 12.

§3 Principle of the operation of the sensor according to the fundamental embodiment In the sensor shown in FIG. 6, in addition to the oscillator 130, excitation means 141, 142, 143 in respective axes directions and force detecting means 151, 152, 153 in respective axes directions are required. In the sensor according to the fundamental embodiment as shown in FIGS. 8 to 12, the excitation means 141, 142, 143 and the force detecting means 151, 152, 153 are constituted by the upper electrodes A1 to A5, the lower electrode B, and the piezoelectric element 10 put therebetween.

Figure 13A:
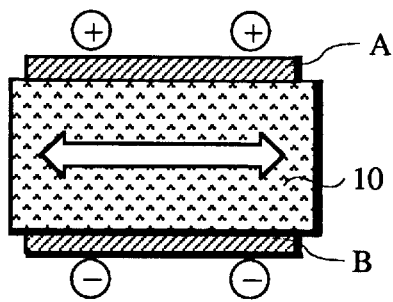
FIGS. 13A and 13B are views showing polarization characteristic of the piezoelectric element 10 in the sensor shown in FIG. 8.
Figure 13B:
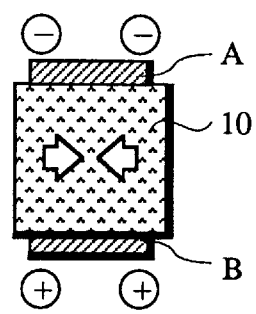

In order to explain that the excitation means and the force detecting means can be constituted by the upper and lower electrodes and the piezoelectric element 10 put therebetween, the fundamental property of the piezoelectric element 10 is first explained. Generally, in a piezoelectric element, a polarization phenomenon takes place by action of mechanical stress. Namely, the piezoelectric element has a property that when stress is applied in a specific direction, positive charges are produced at one portion, whereas negative charges are produced at the other portion. In the sensor of this embodiment, as the piezoelectric element 10, piezoelectric ceramics having a polarization characteristic as shown in FIGS. 13A and 13B is used. Namely, the piezoelectric element 10 has a polarization characteristic such that in the case where a force in a direction to expand along the XY plane is exerted as shown in FIG. 13A, positive charges and negative charges are respectively produced at the upper electrode A and the lower electrode B, while in the case where a force in a direction to contract along the XY plane is exerted as shown in FIG. 13B, negative charges and positive charges are respectively produced at the upper electrode A and the lower electrode B. In contrast, when a predetermined voltage is applied across the upper and lower electrodes, mechanical stress is exerted within the piezoelectric element 10. Namely, when voltage is applied so that positive charges and negative charges are respectively given to the upper electrode A and the lower electrode B as shown in FIG. 13A, a force in a direction to expand along the XY plane is produced. When voltage is applied so that negative charges and positive charges are respectively given to the upper electrode A and the lower electrode B as shown in FIG. 13B, a force in a direction to contract along the XY plane is produced.

The above-described sensor according to the fundamental embodiment utilizes such a property of the piezoelectric element to constitute respective excitation means and respective force detecting means. Namely, by utilizing the property that stress can be produced within the piezoelectric element by applying voltage across upper and lower electrodes, respective excitation means are constituted. By utilizing the property that in the case where stress is internally applied to the piezoelectric element, charges are produced at upper and lower electrodes, respective force detecting means are constituted. The configurations and the operations of these respective means will be described below.

<X-axis direction excitation means>

Figure 14:
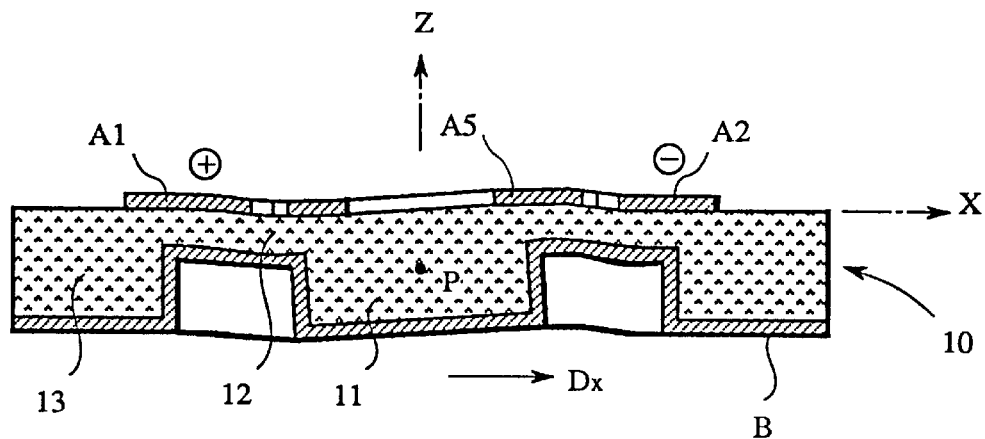
FIG. 14 is a side cross sectional view showing the state where displacement Dx in the X-axis direction is induced with respect to the center of gravity P of the sensor shown in FIG. 8.

The X-axis direction excitation means 141 of the components shown in FIG. 6 is constituted by the upper electrodes A1, A2, a portion of the lower electrode B opposite thereto, a portion of the piezoelectric element 10 put therebetween, and predetermined a.c. supply means. Let us now consider the case where positive voltage is applied to the upper electrode A1 and negative voltage is applied to the upper electrode A2 while keeping the lower electrode B at reference potential. When voltages are applied in this way, stress in a direction to expand in left and right directions of the figure is produced in the piezoelectric element below the electrode A1, and stress in a direction to contract in the left and right directions of the figure is produced in the piezoelectric element below the electrode A2 (see the polarization characteristic of FIGS. 13A and 13B). For this reason, the piezoelectric element 10 is deformed as a whole as shown in FIG. 14, and the center of gravity P of the central portion 11 is caused to undergo displacement by Dx in the X-axis direction. In this instance, when polarity of voltages applied to the upper electrodes A1 and A2 are inverted so that negative voltage and positive voltage are respectively applied to the upper electrode A1 and the upper electrode A2, stress in a direction to contract in left and right directions of the figure is produced in the piezoelectric element below the electrode A1, and stress in a direction to expand in left and right directions of the figure is produced in the piezoelectric element below the electrode A2 in a manner opposite that in FIG. 14. As a result, the center of gravity P of the central portion 11 is caused to undergo displacement by −Dx in the negative direction of the X-axis.

Accordingly, when a first a.c. voltage is applied across the lower electrode B and the upper electrode A1 and a second a.c. voltage having a phase opposite to that of the first a.c. voltage is applied across the lower electrode B and the upper electrode A2, the center of gravity P is caused to alternately undergo displacement of Dx and displacement of −Dx along the X-axis. Thus, the central portion 11 is oscillated along the X-axis. As previously described, the central portion 11 corresponds to the oscillator 130 in the components shown in FIG. 6. Accordingly, by the above-described application of a.c. voltage, the oscillator 130 is permitted to undergo oscillation Ux in the X-axis direction. The frequency of the oscillation Ux can be controlled by the frequency of applied a.c. voltage. Moreover, the amplitude of the oscillation Ux can be controlled by the amplitude value of the applied a.c. voltage. Eventually, the X-axis direction excitation means 141 shown in FIG. 6 is constituted by the upper electrodes A1, A2, the lower electrode B, the piezoelectric element 10 and means (not shown) for supplying a.c. voltage.

<Y axis direction excitation means>

The Y-axis direction excitation means 142 of the components shown in FIG. 6 is constituted by the upper electrodes A3, A4, a portion of the lower electrode B opposite thereto, a portion of the piezoelectric element 10 put therebetween, and predetermined a.c. supply means. The principle of the operation is exactly the same as the above-described principle of the operation of the X-axis direction excitation means 141. Namely, as shown in the top view of FIG. 10, the upper electrodes A1, A2 are disposed on the X-axis, whereas the upper electrodes A3, A4 are disposed on the Y-axis. Accordingly, by the same principle as the principle that a.c. voltages having phases opposite to each other are delivered to the upper electrodes A1, A2, thereby making it possible to oscillate the central portion 11 (oscillator) in the X-axis direction, an approach is employed to deliver a.c. voltages having phases opposite each other to the upper electrodes A3, A4, thereby permitting the central portion 11 (oscillator) to be oscillated in the Y-axis direction.

Namely, by the above-described application of a.c. voltages, the oscillator 130 is permitted to undergo oscillation Uy in the Y-axis direction. The frequency of the oscillation Uy can be controlled by the frequency of the applied a.c. voltage, and the amplitude of the oscillation Uy can be controlled by the amplitude value of the applied a.c. voltage. Eventually, the Y-axis direction excitation means 142 shown in FIG. 6 is constituted by the upper electrodes A3, A4, the lower electrode B, the piezoelectric element 10, and means (not shown) for supplying a.c. voltage.

<Z-axis direction excitation means>

Figure 15:
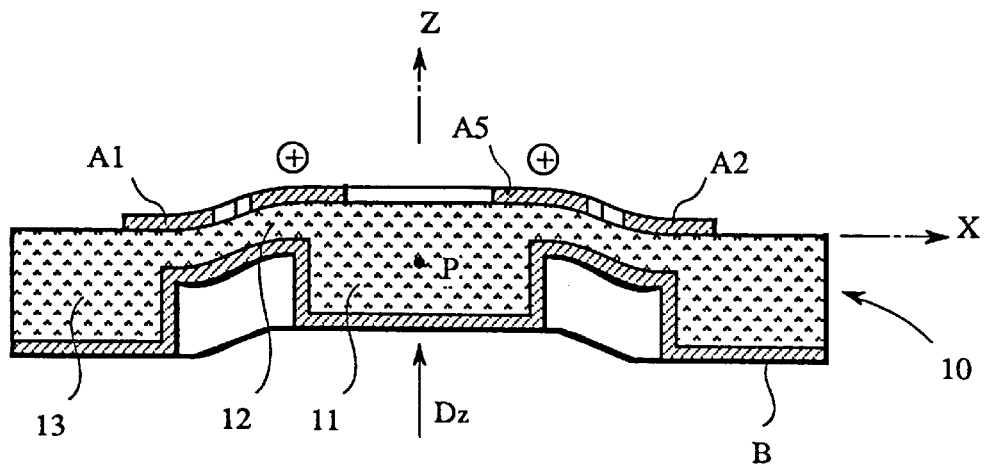
FIG. 15 is a side cross sectional view showing the state where displacement Dz in the Z-axis direction is induced with respect to the center of gravity P of the sensor shown in FIG. 8.

The Z-axis direction excitation means 143 of the components shown in FIG. 6 is constituted by the upper electrode A5, a portion of the lower electrode B opposite thereto, a portion of the piezoelectric element 10 put therebetween, and predetermined a.c. supply means. Let now suppose the case where positive voltage is applied to the upper electrode A5 while keeping the lower electrode B at reference potential. Thus, as shown in the side cross sectional view of FIG. 15, stress in a direction to expand along the XY plane is produced in the piezoelectric element below the electrode A5 (see the polarization characteristic of FIG. 13). As a result, this portion is deformed so that it rises in an upper direction. Thus, the center of gravity P of the central portion 11 is caused to undergo displacement by Dz in the Z-axis direction. In this instance, when polarity of voltage applied to the upper electrode A5 is inverted so that negative voltage is applied thereto, stress in a direction to contract in left and right directions of the figure is produced in the piezoelectric element below the electrode A5. As a result, the center of gravity P of the central portion 11 is caused to undergo displacement by −Dz in the negative Z-axis direction.

Accordingly, when a predetermined a.c. signal is applied across the lower electrode B and the upper electrode A5, the center of gravity P is caused to undergo displacement of Dz, or is caused to undergo displacement of −Dz along the Z-axis. As a result, the central portion 11 is oscillated along the Z-axis. As previously described, the central portion 11 corresponds to the oscillator 130 in the components shown in FIG. 6. Accordingly, the oscillator 130 is permitted to undergo oscillation Uz in the Z-axis direction by the above-described application of a.c. voltage. The frequency of the oscillation Uz can be controlled by the frequency of applied a.c. voltage, and the amplitude of the oscillation Uz can be controlled by the frequency of the applied a.c. voltage. Eventually, the Z-axis direction excitation means 143 is constituted by the upper electrode A5, the lower electrode B, the piezoelectric element 10 and means (not shown) for supplying a.c. voltage.

<X-axis direction force detecting means>

Figure 16:
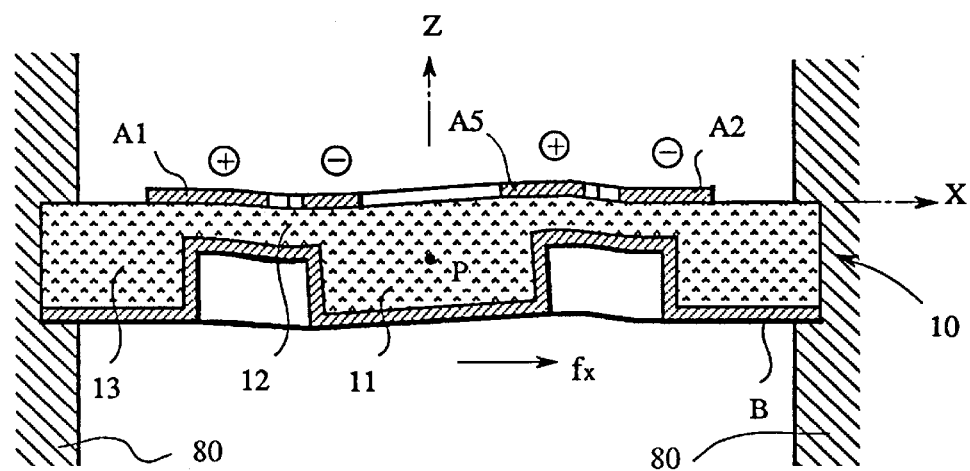
FIG. 16 is a side cross sectional view showing the state where force fx in the X-axis direction is applied to the center of gravity P of the sensor shown in FIG. 8.

The X-axis direction force detecting means 151 of the components shown in FIG. 6 is constituted by the upper electrodes A1, A2, a portion of the lower electrode B opposite thereto, a portion of the piezoelectric element 10 put therebetween, and a detecting circuit which will be described later. Explanation will now be given what phenomenon takes place in the case where force fx based on acceleration is applied to the center of gravity P of the central portion 11 (oscillator 130) in the state where the peripheral portion 13 of this sensor is fixed to a casing 80. Initially, let consider the case where force fx in the X-axis direction is applied to the center of gravity P as shown in FIG. 16 as the result of the fact that acceleration is applied to the center of gravity P. By application of such force fx, bending is produced in the flexible portion 12. Thus, deformation as shown in FIG. 16 takes place. As a result, the upper electrode A1 disposed along the X-axis expands in the X-axis direction, and the upper electrode A2 similarly disposed along the X-axis contracts in the X-axis direction. Moreover, the left side portion in FIG. 16 of the upper electrode A5 contracts in the X-axis direction and the right side portion in FIG. 16 of the same upper electrode A5 expands in the X-axis direction. Since the piezoelectric element positioned below these upper electrodes has a polarization characteristic as shown in FIG. 13, charges of polarity as shown in FIG. 16 are produced in the respective upper electrodes. It is to be noted that since the upper electrode A5 is a single electrode having point symmetrical shape with respect to the origin O, even if charges of "−" and charges of "+" are respectively produced at the left side portion and the right side portion of FIG. 16, both charges are canceled, with the result that no charge is produced in total. Similarly, since the lower electrode B is a single common electrode, even if charges of "+" or "−" are partially produced, they are canceled, with the result that no charge is produced in total.

Accordingly, if a difference between charges produced in the upper electrode A1 and charges produced in the upper electrode A2 is determined, force fx applied in the X-axis direction can be obtained. It should be noted that while explanation has been given by taking the example where force fx applied resulting from acceleration is detected, Coriolis force Fx applied resulting from angular velocity can be also detected exactly in the same manner. In practice, as a force in the X-axis direction applied to the center of gravity P, a force fx resulting from acceleration and a Coriolis force Fx resulting from angular velocity are homogenous to each other, and it is therefore impossible to discriminate between them as a force detected moment by moment.

<Y-axis direction force detecting means>

The Y-axis direction force detecting means 152 of the components shown in FIG. 6 is constituted by the upper electrodes A3, A4, a portion of the lower electrode B opposite thereto, a portion of the piezoelectric element 10 put therebetween, and a detecting circuit which will be described later. The principle of detection is similar to the principle of detection of the above-described X-axis direction force detecting means 151. Namely, it is sufficient to consider what phenomenon takes place in the case where force fy based on acceleration is applied to the center of gravity P of the central portion 11 (oscillator 130) in the state where the peripheral portion 13 of this sensor is fixed to the casing 80. When force fy in the Y-axis direction is exerted as a result of the fact that acceleration $\alpha y$ in the Y-axis direction is applied to the center of gravity P, negative charges are produced in the upper electrode A3, and positive charges are produced in the upper electrode A4. Accordingly, if a difference between charges produced in the upper electrode A3 and charges produced in the upper electrode A4 is determined, force fy applied in the Y-axis direction can be obtained. Detection of Coriolis force Fy applied resulting from angular velocity is exactly the same.

<Z-axis direction force detecting means>

Figure 17:
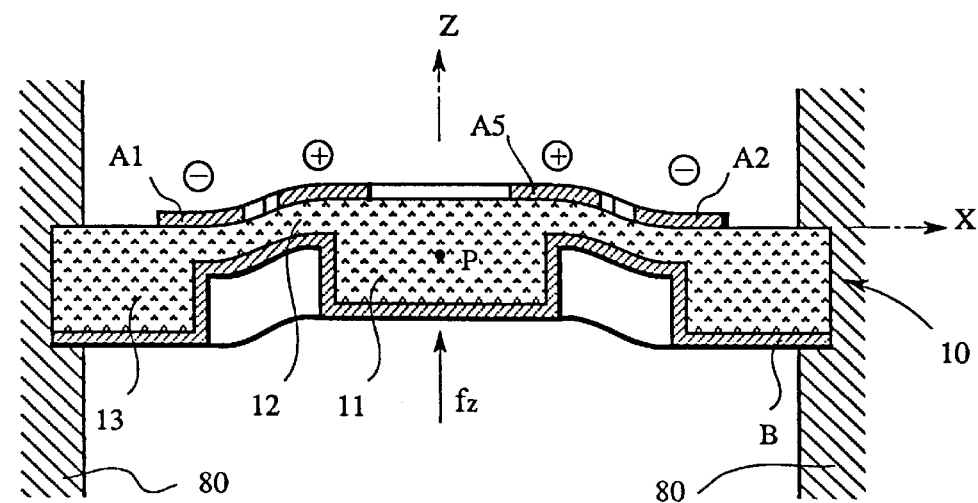
FIG. 17 is a side cross sectional view showing the state where force fz in the Z-axis direction is applied to the center of gravity P of the sensor shown in FIG. 8.

The Z-axis direction force detecting means 153 of the components shown in FIG. 6 is constituted by the upper electrode A5, a portion of the lower electrode B opposite thereto, a portion of the piezoelectric element 10 put therebetween, and a detecting circuit which will be described later. What phenomenon takes place in the case where force fz based on acceleration is applied to the center of gravity P of the central portion 11 (oscillator 130) in the state where the peripheral portion 13 of this sensor is fixed to the casing 80 will now be described. Let first consider the case where force fz in the Z-axis direction is applied to the center of gravity P as shown in FIG. 17 as a result of the fact that acceleration $\alpha z$ in the Z-axis direction is applied to the center of gravity P. By such application of force fz, bending is produced in the flexible portion 12. Thus, deformation as shown in FIG. 17 takes place. As a result, since the upper electrodes A1 to A4 disposed within the outside annular region contract, charges of "−" are produced in the upper electrodes A1 to A4. Since the upper electrode A5 disposed within the inside annular region expands, charges of "+" are produced in the upper electrode A5. At this time, since the lower electrode B is a single common electrode, even if charges of polarity of "+" or "−" are partially produced, they are canceled. Thus, there is no charge produced in total.

Accordingly, force fz applied in the Z-axis direction can be obtained by charges produced in the upper electrode A5. Of course, force fz can be detected also by charges produced in the upper electrodes A1 to A4. However, as previously described, since the upper electrodes A1, A2 are used for detection of force fx and the upper electrodes A3, A4 are used for detection of force fy, the upper electrode A5 is used as the electrode for detecting force fz. Additionally, Coriolis force Fz applied resulting from angular velocity can be detected entirely in the same manner.

Figures 18, 19:
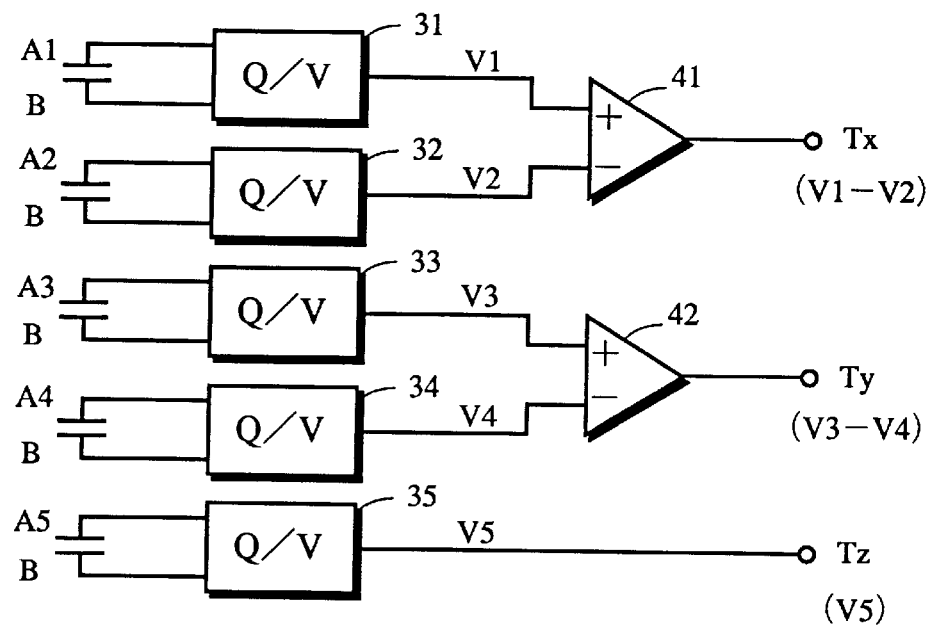
FIG. 18 is a table showing the polarity of charges in respective upper electrodes A1 to A5 when force components fx, fy, fz in respective axis directions caused by acceleration are applied to the sensor shown in FIG. 8.
FIG. 19 is a circuit diagram showing one example of a detection circuit used in the sensor shown in FIG. 8.

§4 Detecting circuit used for the sensor according to the fundamental embodiment When polarities of charges produced in the respective upper electrodes in the case where respective force components fx, fy, fz are applied to the central portion 11 in the above-described sensor according to the fundamental embodiment are collectively indicated, a table shown in FIG. 18 is obtained. A section labeled "0" in the table indicates that since the piezoelectric element partially expands, but partially contracts, quantities of plus and minus are canceled so that no charge is produced in total. Since the respective upper electrodes have a shape symmetrical with respect to the X-axis and/or the Y-axis as previously described, even if force fy is exerted, no charge is produced in an upper electrode where charges are produced by action of force fx. In contrast, in an upper electrode where charges are produced by action of force fy, even if force fx is applied thereto, no charge is produced. It is important to allow the electrode shape to be symmetrical with respect to an axis as stated above for the purpose of avoiding other axis interference. It is to be noted that while the table of FIG. 18 shows polarity when force components +fx, +fy, +fz in positive directions of respective axes are applied in either case, when force components −fx, −fy, −fz in negative directions of respective axes are applied, charges of polarities respectively opposite to those in this table appear. It is easily understood by making reference to the deformation state shown in FIGS. 16 and 17 and an arrangement of the respective upper electrodes shown in FIG. 10 that such a table is obtained. In addition, a magnitude of applied force can be detected as quantity of charges produced.

In order to carry out detection of force components fx, fy, fz (or Coriolis force components Fx, Fy, Fz) on the basis of such principle, it is sufficient to prepare, e.g., a detection circuit as shown in FIG. 19. In this detection is circuit, Q/V converting circuits 31 to 35 are circuits for converting quantities of charges produced in the respective upper electrodes A1 to A5 into voltage values when a potential of the lower electrode B is assumed to be a reference potential. For example, in the case where charges of "+" are produced in the upper electrode, positive voltage (with respect to the reference potential) corresponding to quantity of charges produced are outputted from the detection circuit. In contrast, in the case where charges of "−" are produced in the upper electrode, negative voltage (with respect to the reference potential) corresponding to quantity of charges produced is outputted from the detection circuit. Voltages V1 to V5 outputted in this way are delivered to operation elements 41, 42. Thus, outputs of these operation elements 41, 42 are obtained at terminals Tx, Ty. In this case, a voltage value with respect to the reference potential of the terminal Tx becomes a detection value of force fx (or Coriolis force Fx), a voltage value with respect to the reference potential of the terminal Ty becomes a detection value of force fy (or Coriolis force Fy), and a voltage value with respect to the reference potential of the terminal Tz becomes a detection value of force fz (or Coriolis force Fz).

It can be understood by making reference to the table of FIG. 18 that voltage values obtained on respective output terminals Tx, Ty, Tz become detection values of force components fx, fy, fz. For example, in the case where force fx is applied, charges of "+" are produced in the upper electrode A1 and charges of "−" are produced in the upper electrode A2. Accordingly, V1 becomes positive voltage and V2 becomes negative voltage. In view of the above, calculation of V1−V2 is performed by the operation element 41, whereby the sum of respective absolute values of the voltages V1, V2 is determined. This is outputted to the terminal Tx as a detection value of force fx. Similarly, in the case where force fy is exerted, charges of "+" are produced in the upper electrode A3 and charges of "−" are produced in the upper electrode A4. Accordingly, V3 becomes positive voltage and V4 becomes negative voltage. In view of the above, calculation of V3−V4 is performed by the operation element 42, whereby sum of respective absolute values of the voltages V3, V4 is determined. This is outputted to the terminal Ty as a detection value of force fy. Moreover, in the case where force fz is exerted, charges of "+" are produced in the upper electrode A5. Accordingly, V5 becomes positive voltage. This voltage is outputted to the terminal Tz as it is as a detection value of force fz.

It should be noted that detection values obtained on respective output terminals Tx, Ty, Tz do not include other axes components. This is because the respective upper electrodes have symmetrical shapes with respect to respective coordinate axes or a point symmetrical shape with respect to the origin. For example, in the case where only force fx is applied as indicated by the table of FIG. 18, no charge is produced in the upper electrodes A3, A4 for detecting force fy or in the upper electrode A5 for detecting force fz, so that no detection voltage is obtained on the terminal Ty or the terminal Tz. In the case where only force fy is exerted, no detection voltage is similarly obtained except on the terminal Ty. Moreover, in the case where only force fz is exerted, charges are produced also in the upper electrodes A1 to A4. However, since the charges produced are all charges of the same polarity and the same quantity, those charges are canceled by calculation of the operation elements 41 and 42. As a result, no detection voltage is obtained on the terminals Tx and Ty. In this way, three axes direction components of XYZ can be independently detected. It is to be noted that, as seen from the table of FIG. 18, it is also possible to detect force fx on the basis of charges produced in the upper electrodes A1 to A4, and it is also possible to determine is it on the basis of a sum total of voltages V1 to V4 in the circuit shown in FIG. 19.

§5 Detection procedure of the sensor according to the fundamental embodiment

From the foregoing description, it can be understood that the sensor according to the fundamental embodiment shown in FIGS. 8 to 12 includes respective excitation means and respective force detecting means shown in the block diagram of FIG. 6. In this case, respective electrodes are commonly used with respect to these respective means. For example, the upper electrodes A1 and A2 serve as components of the X-axis direction excitation means 141, and these electrodes also serve as components of the X-axis direction force detecting means 151. While this sensor has a function to detect acceleration components $\alpha x$, $\alpha y$, $\alpha z$ in respective axes directions, and angular velocity components $\omega x$, $\omega y$, $\omega z$ about respective axes, since individual electrodes are commonly used with respect to plural means as described above, it is necessary to properly use respective electrodes in dependency upon an object to be detected.

Initially, the procedure for detecting acceleration components $\alpha x$, $\alpha y$, $\alpha z$ in respective axes directions will be described. In order to carry out detection of acceleration, it is unnecessary to oscillate the oscillator 130. As shown in the block diagram of FIG. 7, it is sufficient that force detecting means 151 to 153 in respective axes directions can be constituted. Accordingly, if the detection circuit shown in FIG. 19 is prepared, detections of acceleration components $\alpha x$, $\alpha y$, $\alpha z$ in respective axes directions can be made. As previously described above, detection values of force components fx, fy, fz applied to the central portion 11 can be obtained on the terminals Tx, Ty, Tz of the detection circuit shown in FIG. 19. Since acceleration $\alpha$ and force f resulting therefrom have relationship of $f=m\cdot\alpha$ on the basis of mass m of the central portion 11, it is possible to detect acceleration components $\alpha x$, $\alpha y$, $\alpha z$ in respective axes directions on the basis of obtained force components fx, fy, fz.

The procedure for detecting angular velocity $\omega x$ about the X-axis will now be described. In accordance with the detection principle shown in FIG. 3, if Coriolis force Fy applied in the Y-axis direction is detected in the state where the oscillator 130 is caused to undergo oscillation Uz in the Z-axis direction, it is possible to obtain angular velocity $\omega x$ about the X-axis on the basis of the formula expressed as $Fy=2m\cdot vz\cdot\omega x$. In this formula, m is mass of the oscillator 130 and vz is instantaneous velocity in the Z-axis direction of the oscillator 130. In view of the above, under the condition where an a.c. voltage is applied across the upper electrode A5 and the lower electrode B to allow the central portion 11 to be placed in energized (oscillated) state in the Z-axis direction, if charges are produced in the upper electrodes A3 and A4 so that a voltage value, which is a detection value of Coriolis force Fy applied in the Y-axis direction, is outputted on the terminal Ty in the detection circuit shown in FIG. 19, it is possible to obtain angular velocity $\omega x$ about the X-axis by operation (calculation).

Subsequently, the procedure for detecting angular velocity $\omega y$ about the Y-axis will be described. In accordance with the detection principle shown in FIG. 4, if Coriolis force Fz applied in the Z-axis direction is detected in the state where the oscillator 130 is caused to undergo oscillation Ux in the X-axis direction, it is possible to obtain angular velocity $\omega y$ about the Y-axis on the basis of the formula expressed as $Fz=2m\cdot vx\cdot\omega y$. In this formula, m is mass of the oscillator 130, and vx is instantaneous velocity in the X-axis direction of the oscillator 130. Accordingly, under the condition where a.c. voltages of phases opposite to each other are respectively applied across the upper electrode A1 and the lower electrode B and across the upper electrode A2 and the lower electrode B to allow the central portion 11 to be in the state energized (oscillated) in the X-axis direction, if charges are produced in the upper electrode A5 so that a voltage value, which is a detection value of Coriolis force Fz applied in the Z-axis direction, is outputted on the terminal Tz in the detection circuit shown in FIG. 19, it is possible to obtain angular velocity $\omega y$ about the Y-axis by operation (calculation).

Finally, the procedure for detecting angular velocity ωz about the Z-axis will be described. In accordance with the detection principle shown in FIG. 5, if Coriolis force Fx applied in the X-axis direction is detected in the state where the oscillator 130 is caused to undergo oscillation Uy in the Y-axis direction, it is possible to obtain angular velocity ωz about the Z-axis on the basis of the formula expressed as Fx=2m·vy·ωz. In the above formula, m is mass of the oscillator 130 and vy is instantaneous velocity in the Y-axis direction of the oscillator 130. Accordingly, under the condition where a.c. voltages of phases opposite to each other are respectively applied across the upper electrode A3 and the lower electrode B and across the upper electrode A4 and the lower electrode B to allow the central portion 11 to be placed in the state energized (oscillated) in the Y-axis direction, if charges are produced in the upper electrodes A1 and A2 so that a voltage value, which is a detection value of Coriolis force Fx applied in the X-axis direction, is outputted on the terminal Tx in the detection circuit shown in FIG. 19, it is possible to obtain angular velocity ωz about the Z-axis by operation (calculation).

As described above, the sensor according to the fundamental embodiment has a function to detect all of the acceleration components αx, αy, αz in respective axes directions and angular velocity components ωx, ωy, ωz about respective axes.

§6 Angular velocity detecting procedure based on another principle

Figure 20:
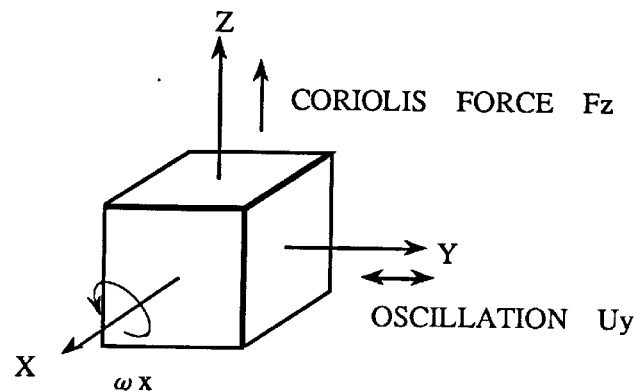
FIG. 20 is a view for explaining another fundamental principle for detecting angular velocity $\omega x$ about the X-axis by using a sensor according to this invention.
Figure 21:
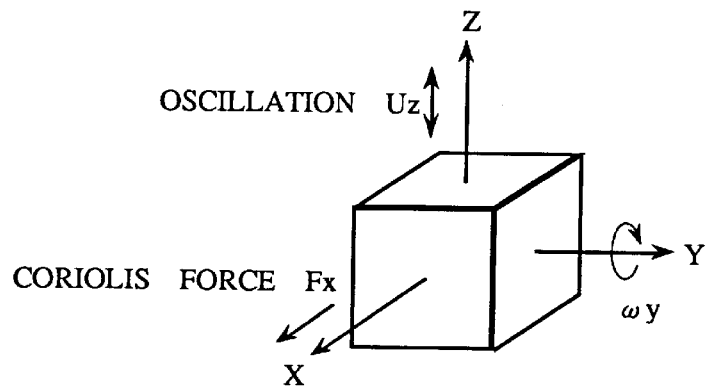
FIG. 21 is a view for explaining another fundamental principle for detecting angular velocity $\omega y$ about the Y-axis by using a sensor according to this invention.
Figure 22:
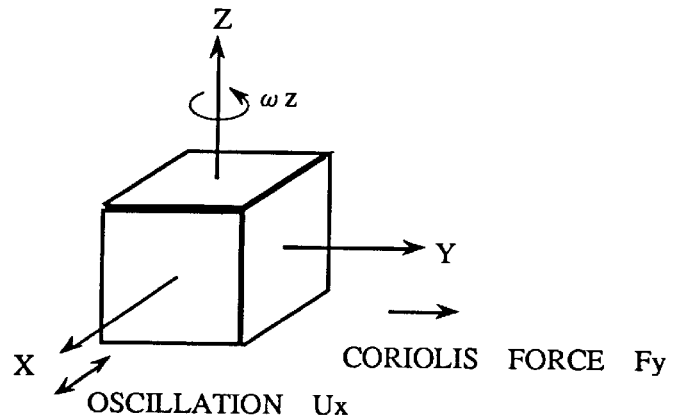
FIG. 22 is a view for explaining another fundamental principle for detecting angular velocity ωz about the Z-axis by using a sensor according to this invention.

While the above-described angular velocity detecting procedure of §5 is based on the principle shown in FIGS. 3 to 5, a principle shown in FIGS. 20 to 22 is also effective as another detection principle for angular velocity. Namely, detection of angular velocity utilizing Coriolis force is based on the fundamental principle that "under the condition where an oscillator is caused to undergo oscillation along the first coordinate axis, when Coriolis force produced along the second coordinate axis is detected, an angular velocity about the third axis can be obtained." In this fundamental principle, it is possible to select any correspondences between the respective first, second and third coordinate axes and the respective X-axis, Y-axis and Z-axis coordinate axes in the XYZ three-dimensional coordinate system. Accordingly, if the principle shown in FIGS. 3 to 5 and the principle shown in FIGS. 20 to 22 are combined, six kinds of angular velocity detecting procedures in total as described below may be employed. By selecting three kinds of procedures among them, detection of angular velocity components about three axes can be made.

(1) An approach is employed to apply an a.c. voltage across the upper electrode A5 and the lower electrode B so that oscillation Uz in the Z-axis direction is caused. Under the oscillation Uz, Coriolis force Fy in the Y-axis direction is detected on the basis of charges produced in the upper electrodes A3 and A4. As a result, angular velocity ωx about the X-axis is obtained (the principle of FIG. 3).

(2) An approach is employed to apply a.c. voltages of phases opposite to each other across the upper electrode A1 and the lower electrode B and across the upper electrode A2 and the lower electrode B so that oscillation Ux in the X-axis direction is caused. Under the oscillation Ux, Coriolis force Fz in the Z-axis direction is detected on the basis of charges produced in the upper electrode A5. As a result, angular velocity ωy about the Y-axis is obtained (the principle of FIG. 4).

(3) An approach is employed to apply a.c. voltages of phases opposite to each other across the upper electrode A3 and the lower electrode B and across the upper electrode A4 and the lower electrode B so that oscillation Uy in the Y-axis direction is caused. Under the oscillation Uy, Coriolis force Fx in the X-axis direction is detected on the basis of charges produced in the upper electrodes A1 and A2. As a result, angular velocity ωz about the Z-axis is obtained (the principle of FIG. 5).

(4) An approach is employed to apply a.c. voltages of phases opposite to each other across the upper electrode A3 and the lower electrode B and across the upper electrode A4 and the lower electrode B so that oscillation Uy in the Y-axis direction is caused. Under the oscillation Uy, Coriolis force Fz in the Z-axis direction is detected on the basis of charges produced in the upper electrode A5. As a result, angular velocity ωx about the X-axis is obtained (the principle of FIG. 20).

(5) An approach is employed to apply an a.c. voltage across the upper electrode A5 and the lower electrode B so that oscillation Uz in the Z-axis direction is caused. Under the oscillation Uz, Coriolis force Fx in the X-axis direction is detected on the basis of charges produced in the upper electrodes A1 and A2. As a result, angular velocity ωy about the Y-axis is obtained (the principle of FIG. 21).

(6) An approach is employed to apply a.c. voltages of phases opposite to each other across the upper electrode A1 and the lower electrode B and across the upper electrode A2 and the lower electrode B so that oscillation Ux in the X-axis direction is caused. Under the oscillation Ux, Coriolis force Fy in the Y-axis direction is detected on the basis of charges produced in the upper electrodes A3 and A4. As a result, angular velocity ωz about the Z-axis is obtained (the principle of FIG. 22).

§7 Embodiment for implementing localized polarization processing to piezoelectric element In order to detect acceleration or angular velocity by a sensor according to this invention, it is necessary to apply a predetermined a.c. voltage to respective upper electrodes, and to detect charges produced in the respective upper electrodes. For this reason, it is necessary to carry out wiring for voltage supply with respect to the respective upper electrodes, and to prepare a detection circuit as shown in FIG. 19. However, in the case where such sensors are mass-produced, the cost for wiring and preparing detection circuits cannot be neglected as compared to the total cost of the product. In the embodiment described below, a polarization characteristic of a piezoelectric element is partially varied to thereby simplify the wiring and/or the detection circuit, thus to reduce the manufacturing cost.

Figure 23A:
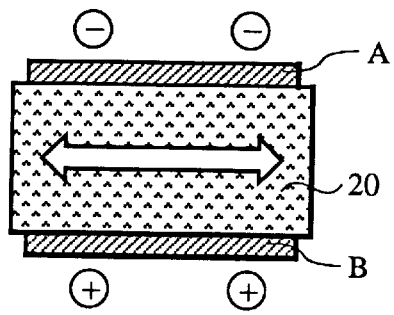
FIGS. 23A and 23B are views showing polarization characteristics of the piezoelectric element 20 different from the piezoelectric element 10.
Figure 23B:
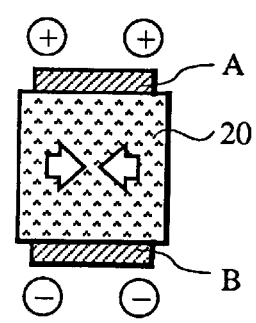

In piezoelectric ceramics, etc., an element having an arbitrary polarization characteristic can be manufactured. For example, the piezoelectric element 10 used in the above-described sensor according to the fundamental embodiment was an element having a polarization characteristic of the type I as shown in FIGS. 13A and 13B. On the contrary, a piezoelectric element 20 having a polarization characteristic of the type II as shown in FIGS. 23A and 23B can manufactured. Namely, it is possible to manufacture a piezoelectric element 20 having a polarization characteristic such that in the case where a force in a direction to expand along the XY plane is applied as shown in FIG. 23A, negative charges and positive charges are respectively produced in the upper electrode A and the lower electrode B, while in the case where a force in a direction to contract along the XY plane is applied as shown in FIG. 23B, positive charges and negative charges are respectively produced in the upper electrode A and the lower electrode B. Moreover, a piezoelectric element may be of a structure such that one portion thereof is caused to have a polarization characteristic of the type I and another portion thereof is caused to have a polarization characteristic of the type II. A sensor of the embodiment described below contemplates simplifying the structure of the sensor by using a piezoelectric element to which such localized polarization processing is implemented.

Figure 24:
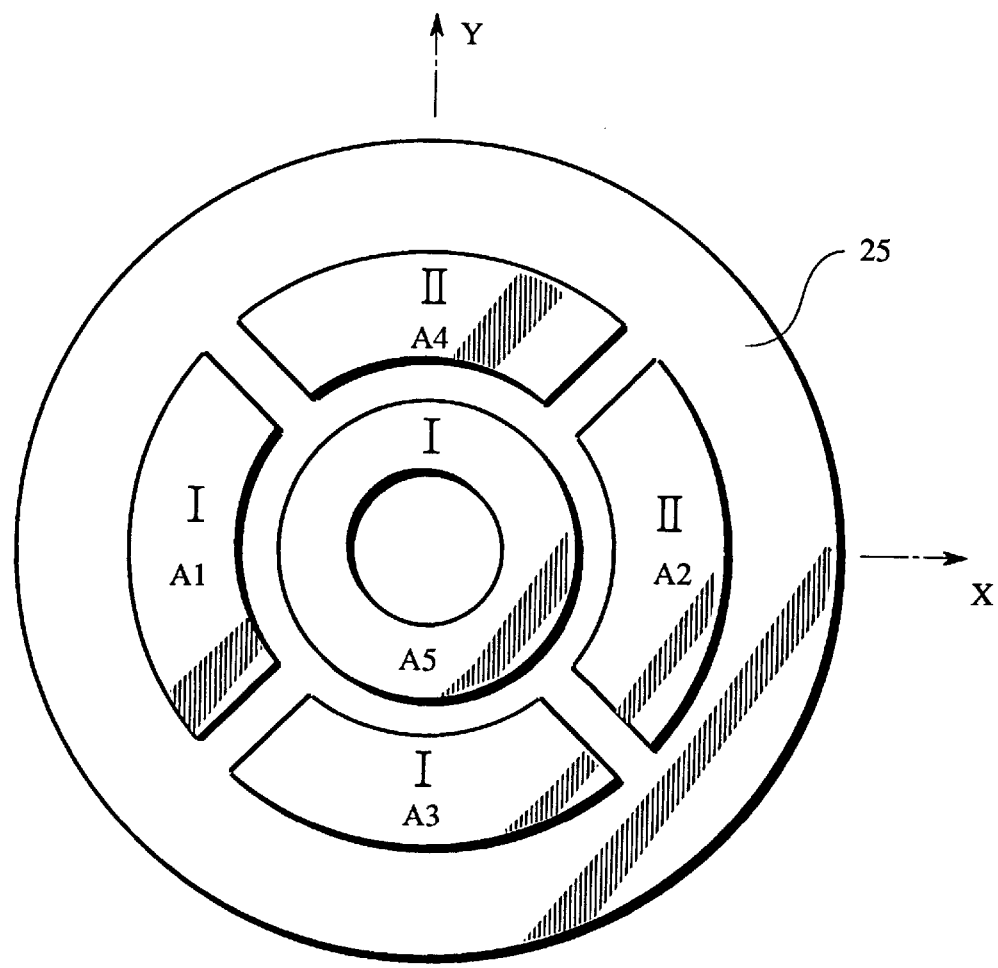
FIG. 24 is a top view of a sensor of an embodiment utilizing the piezoelectric element 25 having a localized polarization characteristic.

The sensor whose top view is shown in FIG. 24 is a sensor using a piezoelectric element 25 to which such a localized polarization processing is implemented. This piezoelectric element 25 is entirely the same in mechanical structure as the piezoelectric element 10 used in the above-described sensor of the fundamental embodiment, wherein an annular groove is provided at the lower surface of the disk-shaped piezoelectric element. However, its polarization characteristic is different from that of the piezoelectric element 10. The piezoelectric element 10 was the element in which all portions have a polarization characteristic of the type I as previously described. On the contrary, the piezoelectric element 25 has a localized polarization characteristic of either the type I or the type II in respective areas corresponding to the five upper electrodes A1 to A5 as shown in FIG. 24. In the figure, the regions located under the upper electrodes A1, A3 and A5 which are indicated by a letter "I" have the polarization characteristic of the type I and the regions located under the upper electrodes A2 and A4 which are indicated by a letter "II" have the polarization characteristic of the type II.

Figures 25, 26:
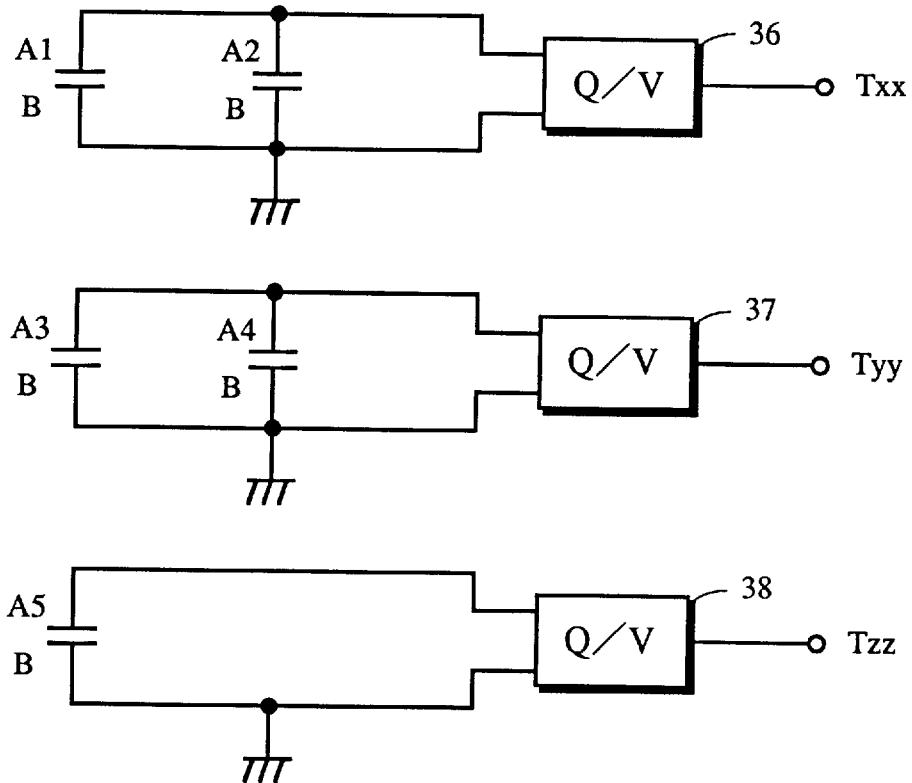
FIG. 25 is a table showing polarity of charges produced in respective upper electrodes A1 to A5 when force components fx, fy, fz in respective axes directions caused by acceleration are applied to the sensor shown in FIG. 24.
FIG. 26 is a circuit diagram showing an example of a detection circuit used in the sensor shown in FIG. 24.

As stated above, the sensor shown in FIG. 24 is a sensor using the piezoelectric element 25 to which localized polarization processing is implemented in place of the piezoelectric element 10. When consideration is made what kinds of polarity of charges are produced in the respective upper electrodes, it is seen that the polarity of charges produced in the upper electrodes formed within the region having the polarization characteristic of the type II is opposite that of the previously described sensor. Namely, polarity relating to the upper electrodes A2 and A4 of the Table shown in FIG. 18 is inverted. Thus, in this sensor, the Table shown in FIG. 25 is obtained (In the Table, bars attached to the upper portions of the names of the upper electrodes indicate that polarity of these electrodes is inverted). The sections encompassed by the thick lines in the table are to be noted. These sections are the sections which participate in detection of force fx, detection of force fy and detection of force fz. In all the cases, charges produced in the upper electrodes a have polarity of "+". For this reason, if a detection circuit as shown in FIG. 26 is prepared with respect to the respective upper electrodes, detection voltage values of force components fx, fy, fz can be respectively obtained on terminals txx, tyy, tzz as they are. In other words, any operation elements 41 and 42 as shown in FIG. 19 do not become necessary.

In the detection circuit shown in FIG. 26, since the lower electrode B is a single common electrode, it is unnecessary to particularly carry out actual wiring to the lower electrode B. In addition, if conductive pattern layers are formed on the upper surface of the piezoelectric element 25 so that the upper electrodes A1 to A5 are made of the pattern layers, mutual wirings therebetween become very simple.

Figure 27A:
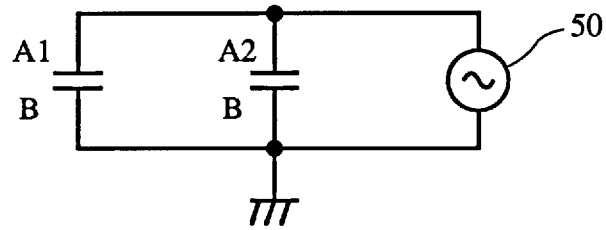
FIGS. 27A, 27B and 27C are circuit diagrams showing an example of excitation circuits used in the sensor shown in FIG. 24.
Figure 27B:
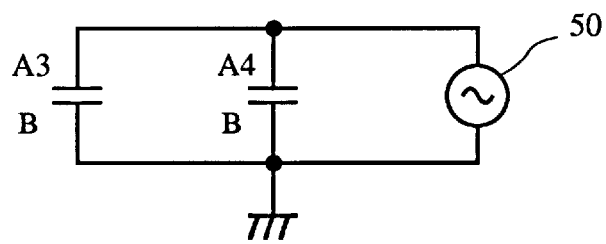
Figure 27C:
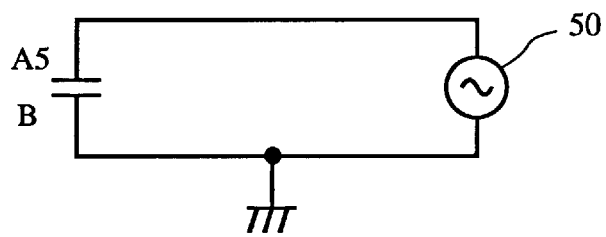

When the piezoelectric element 25 to which a localized polarization processing is implemented is employed, an a.c. voltage supply circuit for excitation (oscillation) is also simplified. For example, in the sensor of the previously described fundamental embodiment, in order to produce oscillation Ux in the X-axis direction, it was necessary to respectively deliver a.c. signals of phases opposite to each other to the upper electrodes A1 and A2. In order to produce oscillation Uy in the Y-axis direction, it was necessary to deliver a.c. signals of phases opposite to each other to the upper electrodes A3 and A4. However, when the piezoelectric element 25 to which localized polarization processing has been implemented is used, a polarization characteristic in the region where the upper electrodes A2 and A4 are formed is inverted. For this reason, the same a.c. signal can delivered to both the upper electrodes A1 and A2, thereby making it possible to produce oscillation Ux in the X-axis direction. Moreover, the same a.c. signal can be delivered to both the upper electrodes A3 and A4, thereby making it possible to produce oscillation Uy in the Y-axis direction. Accordingly, in order to produce oscillation Ux in the X-axis direction, oscillation Uy in the Y-axis direction and oscillation Uz in the Z-axis direction, simple circuits as shown in FIGS. 27A, 27B and 27C may be prepared to commonly use a.c. voltage produced in a single a.c. power supply 50.

As stated above, if localized polarization processing is implemented to a piezoelectric element, it becomes possible to simplify wirings with respect to respective electrodes. In other word, wirings can be simplified, if predetermined polarization processing is respectively implemented to respective portions of the piezoelectric element so that polarization characteristics opposite each other are obtained in the region where the upper electrode A1 is formed and in the region where the upper electrode A2 is formed, and so that polarization characteristics opposite each other are obtained in the region where the upper electrode A3 is formed and in the region where the upper electrode A4 is formed.

Figure 28:
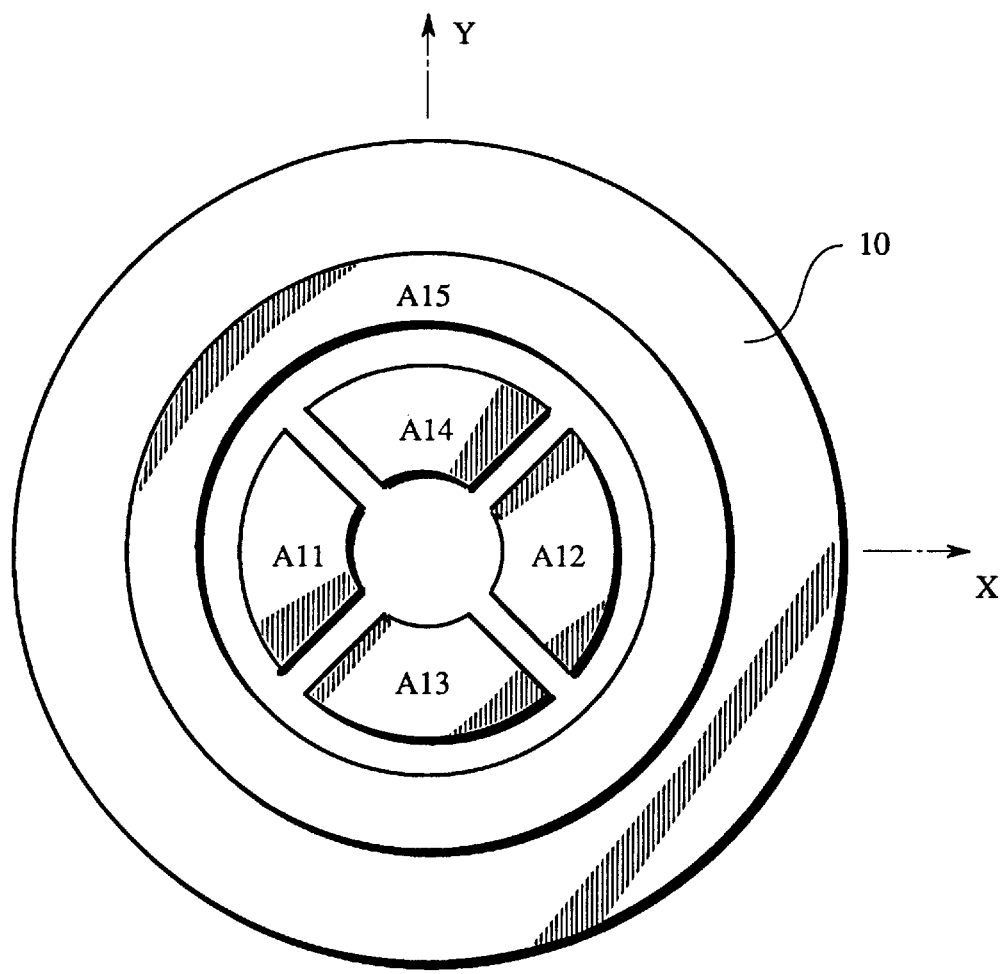
FIG. 28 is a top view of a sensor of an embodiment in which replacement between upper electrodes is carried out with respect to inside and outside electrodes in the sensor shown in FIG. 8.
Figure 29:
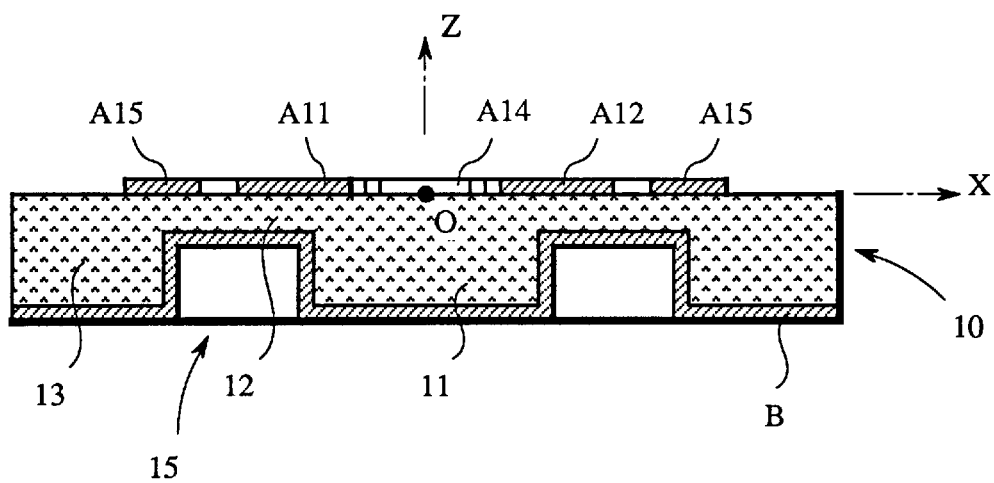
FIG. 29 is a side cross sectional view of the sensor shown in FIG. 28.

§8 Embodiment in which the relationship between the inside and the outside of the upper electrode arrangement is reversed In the previously described sensor of the fundamental embodiment, as shown in the top view of FIG. 10, the upper electrodes A1 to A4 for carrying out excitation (oscillation) and detection relating to the X-axis direction and the Y-axis direction were disposed within the outside annular region, and the upper electrode A5 for carrying out excitation (oscillation) and detection relating to the Z-axis direction was disposed within the inside annular region. The sensor of the embodiment described below is of a structure in which the relationship between the inside and the outside of the upper electrode arrangement is reversed. Namely, as is clearly shown in the top view of FIG. 28 and the side cross sectional view of FIG. 29, upper electrodes A11 to A14 for carrying out excitation (oscillation) and detection relating to the X-axis direction and the Y-axis direction are disposed within the inside annular region, and an upper electrode A15 for carrying out excitation (oscillation) and detection relating to the Z-axis direction is disposed within the outside annular region. In this embodiment, the upper electrodes A11 to A15 respectively perform exactly the same functions as those of the upper electrodes A1 to A5 in the previously described fundamental embodiment. It is to be noted that since deformation states (expansion/contraction states) when bending takes place are different with respect to the inside annular region and the outside annular region, it is necessary for applying the excitation circuit and/or the detection circuit of the previously described fundamental embodiment to this embodiment to implement slight modification such as inversion of polarity, etc.

§9 Embodiment using strain generative body separate from piezoelectric element

All of the previously described embodiments have a structure in which the flexible portion is formed in the piezoelectric element itself so that bending takes place. However, since the piezoelectric element is generally fragile, there is the possibility that when a large stress is applied thereto, cracks may take place so that the piezoelectric element is broken. For this reason, the sensor of the above-described embodiments may be broken in the case where relatively large acceleration or angular velocity is applied thereto.

Figure 30:
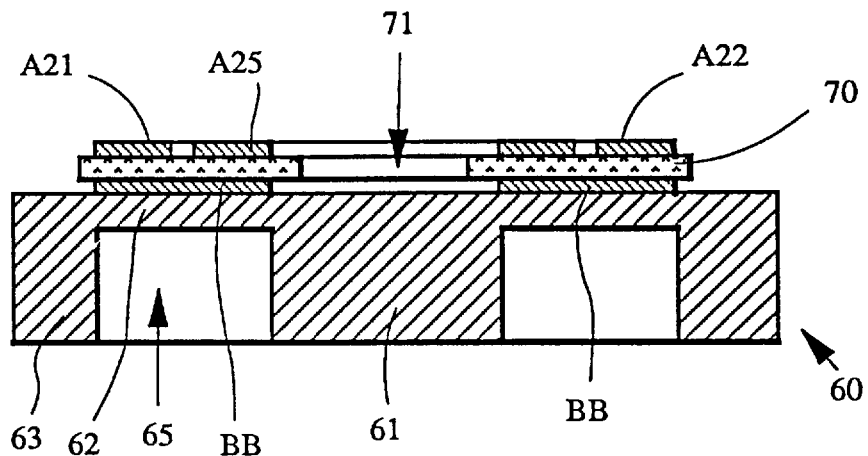
FIG. 30 is a side cross sectional view of a sensor according to an embodiment in which a strain generative body is used in addition to the piezoelectric element.

The embodiment described below provides a structure suitable for measurement of such large acceleration or angular velocity, and its side cross sectional view is shown in FIG. 30. The main feature of this embodiment resides in that a strain generative body 60 is used. The strain generative body 60 is a metallic disk in this embodiment, wherein an annular groove 65 is formed on the lower surface thereof. The portion where the annular groove 65 is formed is caused to serve as a flexible portion 62 and is thin to have flexibility. By bending of the flexible portion 62, displacement can be produced between a central portion 61 of the inside and a peripheral portion 63 of the outside. When the peripheral portion 63 is fixed to the sensor casing, the central portion 61 is in a suspended state from the periphery, thus functioning as a weight or an oscillator.

On the other hand, a piezoelectric element 70 in a plate form is of so called washer-shaped structure having an opening 71 at the central portion thereof, wherein five upper electrodes A21 to A25 are formed on the upper surface thereof and a single lower electrode BB is formed on the lower surface thereof. In this the case, arrangement pattern of the upper electrodes A21 to A25 is exactly the same as the arrangement pattern of the upper electrodes A1 to A5 in the fundamental embodiment shown in FIG. 10. Moreover, the lower electrode BB has the shape of a washer to face all of the upper electrodes A21 to A25. The lower surface of the lower electrode BB is fixed to the upper surface of the strain generative body 60, and the plate surface of the strain generative body 60 and the plate surface of the piezoelectric element 70 are placed in the state where they are substantially parallel to each other. Accordingly, when bending takes place in the flexible portion 62 of the strain generative body 60, this bending is transmitted to the piezoelectric element 70, while when bending takes place in the piezoelectric element 70, this bending is transmitted to the flexible portion 62 of the strain generative body 60.

The operation of the sensor according to this embodiment is exactly the same as the operation of the previously described fundamental embodiment. It is to be noted that, in the sensor of the fundamental embodiment, a portion of the piezoelectric element functions as a weight or an oscillator, whereas, in this embodiment, the central portion 61 of the strain generative body 60 functions as a weight or an oscillator. Namely, when acceleration or Coriolis force is applied to the central portion 61, bending takes place in the flexible portion 62. This bending is transmitted up to the piezoelectric element 70. As a result, predetermined charges are produced in the respective upper electrodes A21 to A25. In contrast, when a predetermined a.c. signal is delivered to the respective upper electrodes A21 to A25, bending takes place in the piezoelectric element 70. This bending is transmitted to the flexible portion 62. As a result, the central portion 61 is oscillated.

Since the strain generative body 60 can be constituted 0f strong material such as metal, etc., even if relatively large acceleration or angular velocity is applied thereto, there is no possibility that it may be broken. In addition, since detection sensitivity of the entirety of the sensor can be adjusted by the thickness of the flexible portion 62 of the strain generative body 60, piezoelectric elements 70 of the same standard are mass-produced to join or connect various strain generative bodies 60 including the flexible portion 62 of different thicknesses thereto, thereby making it possible to manufacture plural kinds of sensors having different sensitivities.

Figure 31:
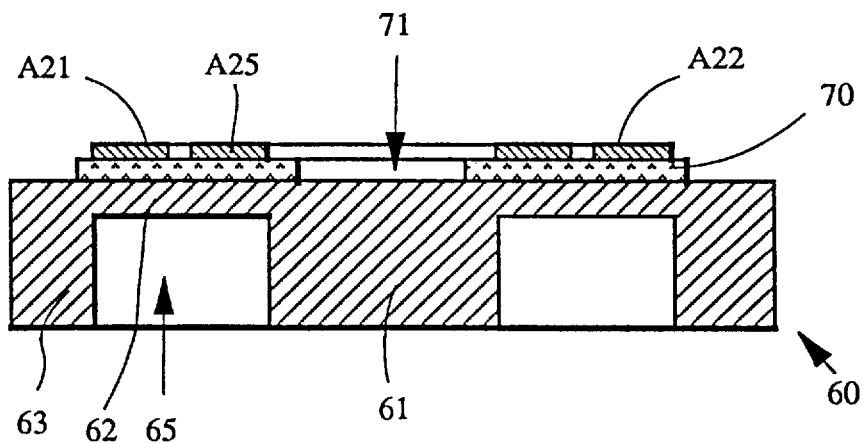
FIG. 31 is a side cross sectional view of a sensor according to an embodiment in which an upper surface of the conductive strain generative body is utilized as a lower electrode.

§10 Embodiment using an upper surface of a strain generative body as a lower electrode The side cross sectional view of another embodiment in which the above-described sensor shown in FIG. 30 is further simplified is shown in FIG. 31. This sensor differs from the sensor shown in FIG. 30 only in that the lower electrode BB is omitted. As previously described, the strain generative body 60 can be constituted of conductive material such as metal, etc. In this case, the upper surface portion of the strain generative body 60 can be used as a lower electrode in place of the lower electrode BB and, therefore, the lower electrode BB can be omitted. Of course, it is sufficient is at least an upper surface portion of the strain generative body 60 is constituted with conductive material.

§11 Embodiment in which an arrangement relationship between the working portion and the fixed portion is reversed It has been described that the peripheral portion 13 of the piezoelectric element or the peripheral portion 63 of the strain generative body was fixed to the sensor casing, and the central portion 11 of the piezoelectric element or the central portion 61 of the strain generative body was used as a weight or an oscillator. In other words, the peripheral portion is utilized as a fixed portion, and the central portion is utilized as a working portion. A force applied to the working portion (force based on acceleration and Coriolis force) is detected as a displacement of the working portion with respect to the fixed portion and oscillation is produced as a reciprocal displacement of the working portion with respect to the fixed portion. However, in a manner opposite the above, there may be employed a configuration such that the central portion is fixed to the sensor casing to use it as a fixed portion, and the peripheral portion is used as a working portion which can be displaced. Particularly, since it is easier to provide a large volume in the peripheral portion as compared to in the central portion, when the peripheral potion is utilized as a working portion (weight/oscillator), mass as a weight or an oscillator can be ensured so as to take a large value. Thus, a high sensitivity sensor can be realized.

§12 Embodiment in which an electrode arrangement is rotated by 45 degrees

In the previously described embodiments, a pair of upper electrodes symmetrical with respect to the X-axis were used to carry out excitation in the X-axis direction or detection of force applied in the X-axis direction, and a pair of upper electrodes symmetrical with respect to the Y-axis are used to carry out excitation in the Y-axis direction or detection of force applied in the Y-axis direction. In the embodiment described below, first to fourth upper electrodes are respectively disposed in the first to fourth quadrants in the XY coordinate system. These four upper electrodes are used in both the case where excitation in the X-axis direction or detection of force applied in the X-axis direction is carried out and the case where excitation in the Y-axis direction or detection of force applied in the Y-axis direction is carried out.

Figure 32:
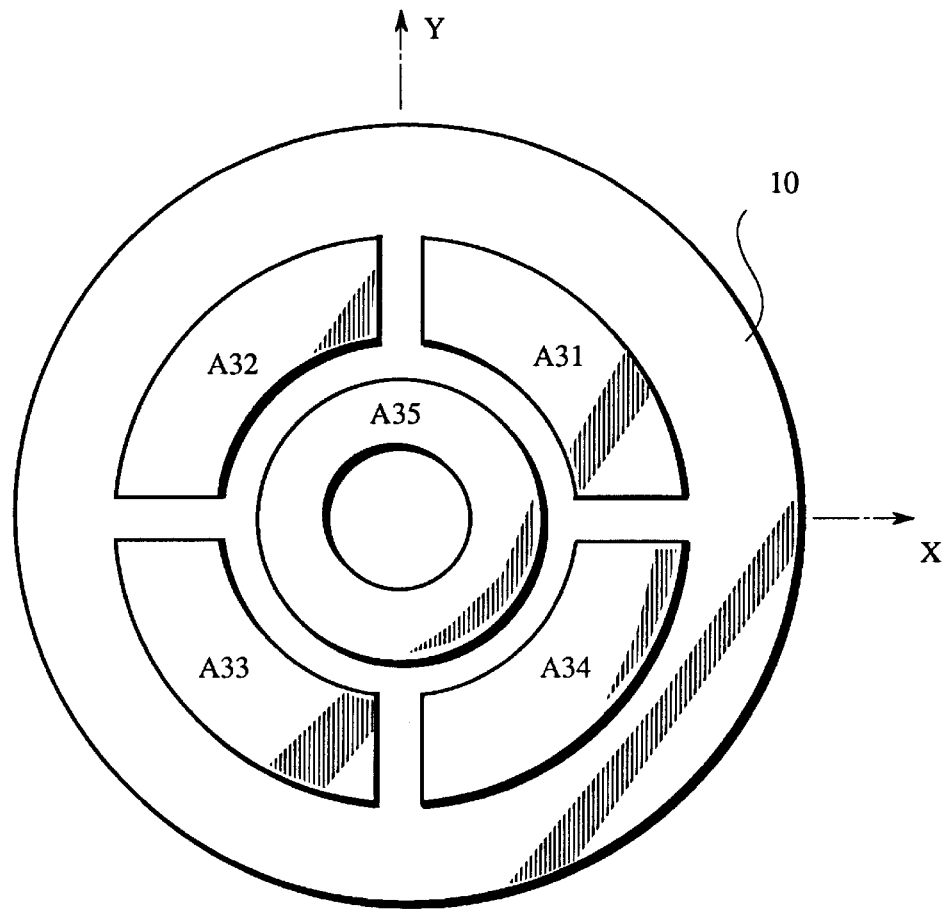
FIG. 32 is a top view of a sensor according to an embodiment in which an electrode arrangement is rotated by 45 degrees.

The top view of the sensor according to this embodiment is shown in FIG. 32. The difference between this sensor and the sensor of the fundamental embodiment shown in FIG. 10 is only the arrangement of the upper electrodes. When the electrode arrangement shown in FIG. 32 is compared to the electrode arrangement of the fundamental embodiment shown in FIG. 10, the feature of the electrode arrangement of this embodiment is clarified. In the embodiment shown in FIG. 32, a first upper electrode A31 is disposed at a position of the first quadrant in the XY coordinate system, a second upper electrode A32 is disposed at a position of the second quadrant, a third upper electrode A33 is disposed at a position of the third quadrant, and a fourth upper electrode A34 is disposed at a position of the fourth quadrant. Additionally, a fifth upper electrode A35 is disposed at a position surrounding the origin similarly to the fundamental embodiment. Eventually, the electrode arrangement of the embodiment shown in FIG. 32 is nothing but the arrangement in which the electrode arrangement of the fundamental embodiment shown in FIG. 10 is rotated by 45 degrees. Of course, it is true that directions of respective axes in the XYZ three-dimensional coordinate system are arbitrarily defined in concept. In other words, there is no actual index indicating the respective axes in the piezoelectric element 10 or the respective upper electrode themselves. Accordingly, from a viewpoint of a physical structure, the sensor shown in FIG. 32 is exactly the same as the sensor shown in FIG. 10. However, it is to be noted that since directions of the respective coordinate axes in concept are defined in a manner shifted by 45 degrees in this embodiment, the technique for operating the sensor is somewhat different.

Namely, in the sensor shown in FIG. 32, in order to oscillate the central portion functioning as an oscillator/weight in the X-axis direction, it is sufficient to deliver a predetermined a.c. signal to the upper electrodes A32 and A33, and to deliver another a.c. signal of opposite phase to the upper electrodes A31 and A34. Moreover, in order to oscillate it in the Y-axis direction, it is sufficient to deliver a predetermined a.c. signal to the upper electrodes A31 and A32, and to deliver another a.c. signal of phase opposite to the above to the upper electrodes A33 and A34. As stated above, both in the case where the piezoelectric element is oscillated in the X-axis direction and in the case where it is oscillated in the Y-axis direction, all of the four upper electrodes A31 to A34 are used. Accordingly, it becomes possible to efficiently deliver oscillation energy. Additionally, in the case where the piezoelectric element is caused to undergo oscillation in the Z-axis direction, an a.c. signal is delivered to the upper electrode A35 similarly to the sensor of the fundamental embodiment shown in FIG. 10.

The technique for detecting force components in the respective axes directions in the sensor shown in FIG. 32 will now be described. Let us first demonstrate a method of detecting force fx in the X-axis direction applied to the central portion functioning as an oscillator/weight. Since the piezoelectric element 10 has a polarization characteristic of the type I shown in FIG. 13, when force fx in the X-axis direction is applied, positive charges are produced in the upper electrodes A32, A33 and negative charges are produced in the upper electrodes A31, A34. Accordingly, when a first sum of charges produced in the upper electrodes A32, A33 and a second sum of charges produced in the upper electrodes A31, A34 are obtained, and a grand sum of the absolute value of the first sum and the absolute value of the second sum (i.e., a difference between both the sums) is obtained, force fx in the X-axis direction can be detected. Moreover, when force fy in the Y-axis direction is applied, positive charges are produced in the upper electrodes A33, A34 and negative charges are produced in the upper electrodes A31, A32. Accordingly, when a first sum of charges produced in the upper electrodes A33, A34 and a second sum of charges produced in the upper electrodes A31, A32 are obtained, and a grand sum of the absolute value of the first sum and the absolute value of the second sum (i.e., a difference between both the sums), force fy in the Y-axis direction can be detected. Additionally, force fz in the Z-axis direction can be detected by charges produced in the upper electrode A35 similarly to the sensor of the fundamental embodiment shown in FIG. 10.

Figure 33:
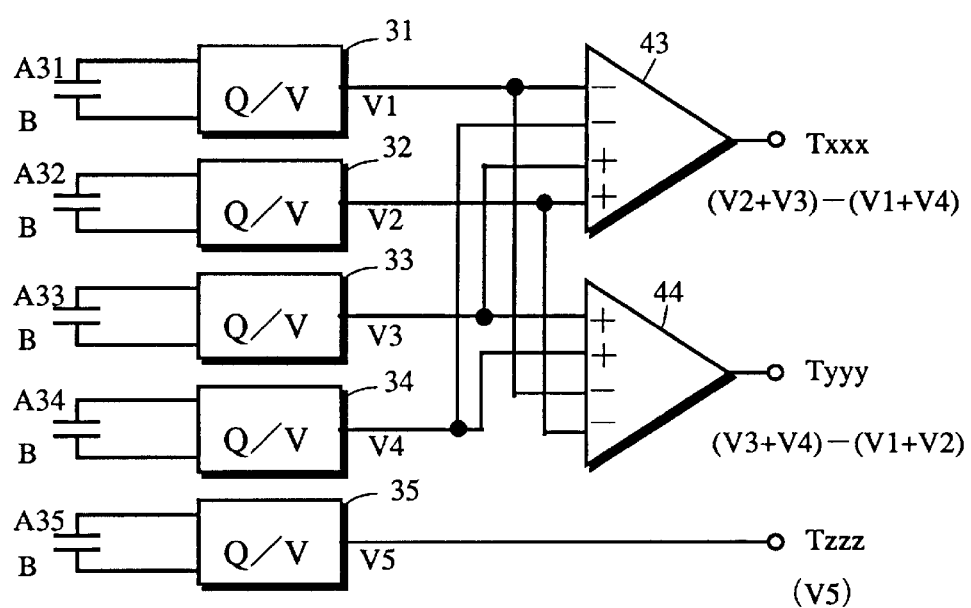
FIG. 33 is a circuit diagram showing an example of a detection circuit used in the sensor shown in FIG. 32.

In order to detect force components applied in the respective axes directions by using the sensor shown in FIG. 32, it is sufficient to prepare a detection circuit shown in FIG. 33. A force fx in the X-axis direction is detected as a difference between voltage (V2+V3) and voltage (V1+V4) on a terminal Txxx, force fy in the Y-axis direction is detected as a difference between voltage (V3+V4) and voltage (V1+V2) on a terminal Tyyy, and force fz in the Z-axis direction is detected as voltage (V5) on a terminal Tzzz. As stated above, both in the case where force fx in the X-axis direction is detected and in the case where force fy in the Y-axis direction is detected, all of the four upper electrodes A31 to A34 are used. Accordingly, applied force can be efficiently detected. Thus, the detection sensitivity can be improved as compared to the fundamental embodiment shown in FIG. 10.

§13 Embodiment in which the number of electrodes is charged

While all the previously described embodiments use five upper electrodes, it is not necessarily required that the number of upper electrodes is five. Several embodiments in which the number of electrodes is changed will be described below.

Figure 34:
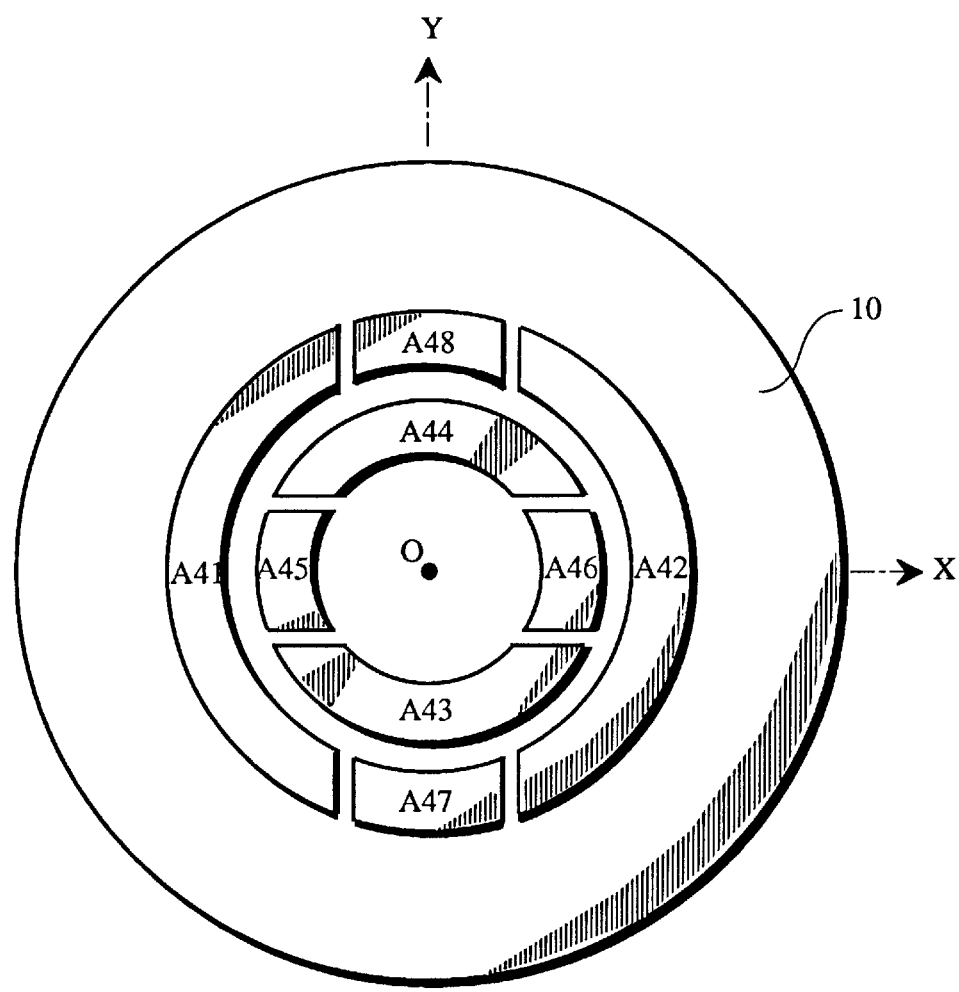
FIG. 34 is a top view of a sensor of an embodiment in which eight upper electrodes are used.
Figure 35:
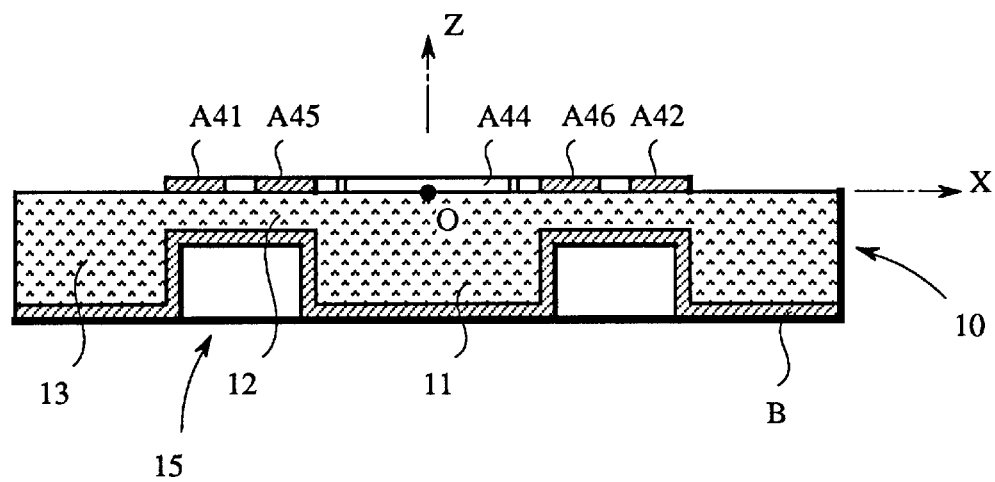
FIG. 35 is a side cross sectional view in which the sensor shown in FIG. 34 is cut along the XZ plane.
Figures 36, 37:
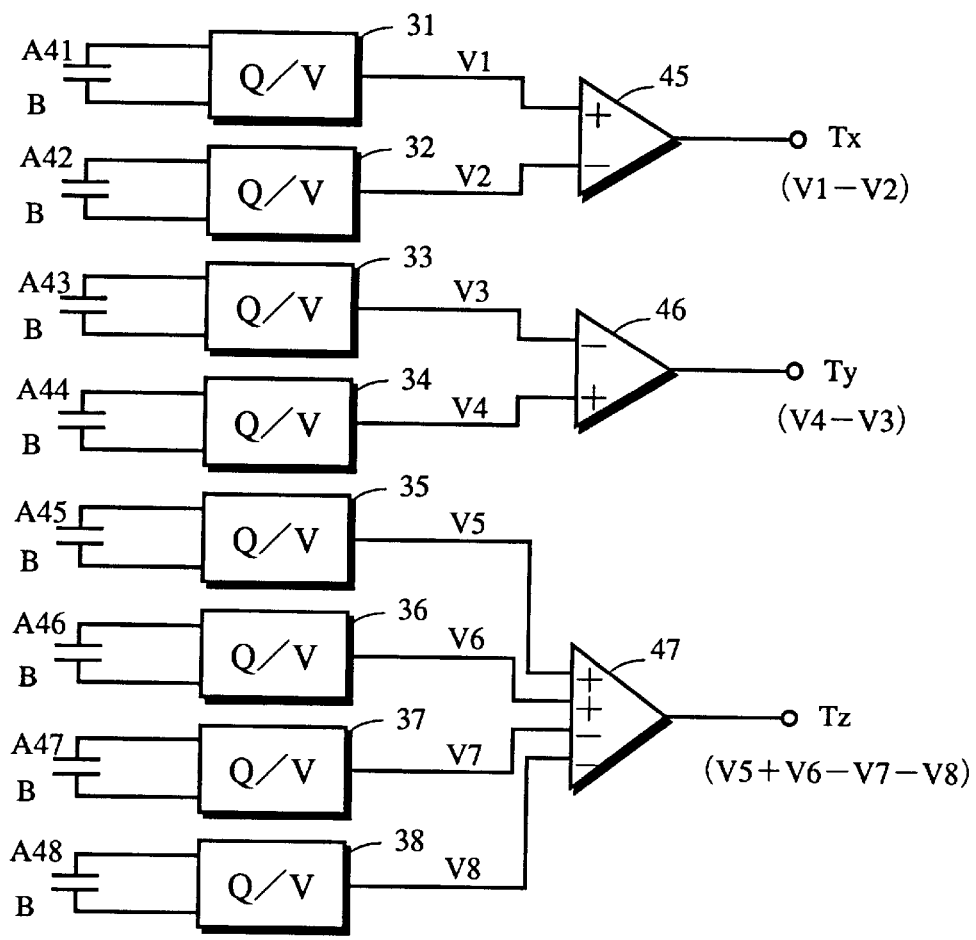
FIG. 36 is a table showing the polarity of charges produced in respective upper electrodes A41 to A48 when force components fx, fy, fz in respective axes directions caused by acceleration are applied to the sensor shown in FIG. 34.
FIG. 37 is a circuit diagram showing an example of a detection circuit used in the sensor shown in FIG. 34.
Figures 38, 39:
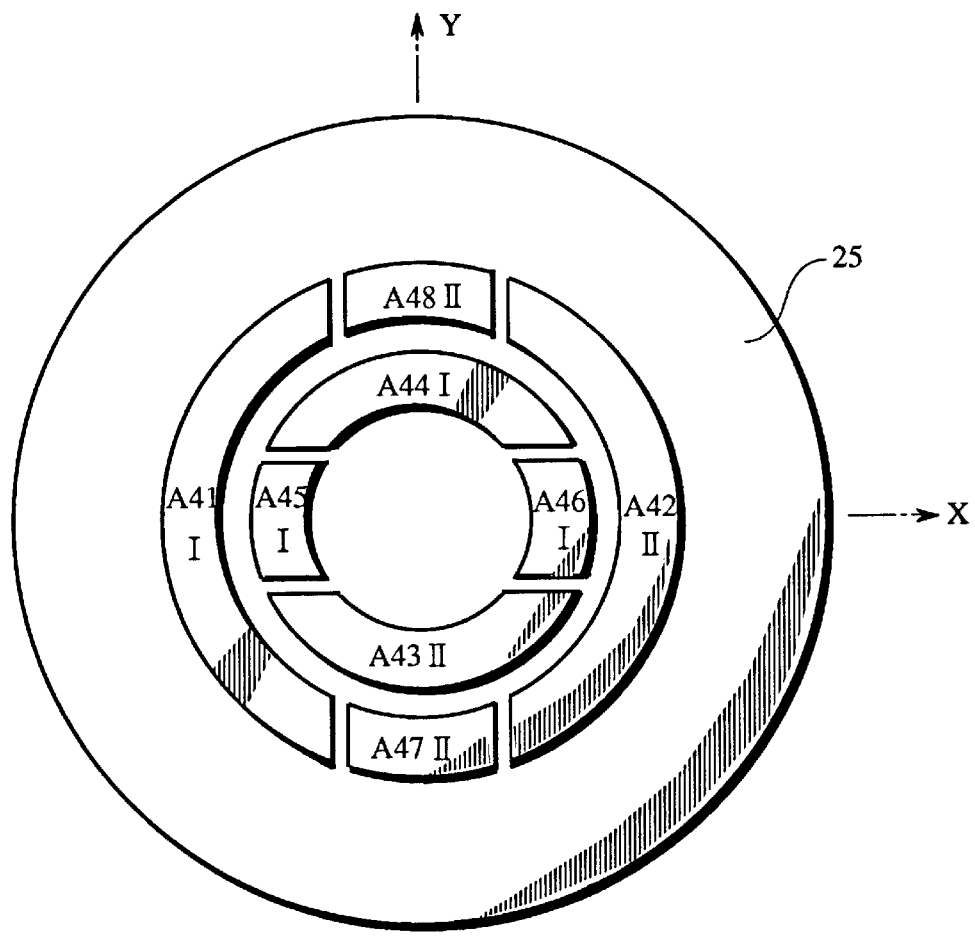
FIG. 38 is a top view of a sensor according to an embodiment utilizing the piezoelectric element 25 having a localized polarization characteristic in the sensor of FIG. 34.
FIG. 39 is a table showing polarity of charges produced in respective upper electrodes A41 to A48 when force components fx, fy, fz in respective axes directions caused by acceleration are applied to the sensor shown in FIG. 38.

FIG. 34 is a top view of the embodiment in which eight upper electrodes A41 to A48 are used. These eight upper electrodes A41 to A48 are all belt-shaped along a circular arc with the origin O being as center, have a shape symmetrical with respect to the X-axis or the Y-axis, and are disposed at positions symmetrical to each other with respect to the X-axis or the Y-axis. FIG. 35 is a cross sectional view of this sensor cut along XZ plane. In this embodiment, the piezoelectric element 10 and the lower electrode B are exactly the same as those of the embodiment shown in FIG. 8. In such a sensor, when force components fx, fy, fz are applied to the central portion 11, charges of predetermined polarities are produced on the respective upper electrodes as shown in the table of FIG. 36. Thus, force components fx, fy, fz in the respective axes directions can be detected on the basis of these charges. In a more practical sense, it is sufficient to prepare a detection circuit as shown in FIG. 37. Moreover, when a piezoelectric element 25 having a localized polarization characteristic as shown in FIG. 38 is used in place of the piezoelectric element 10, polarities of charges produced in the upper electrodes A42, A43, A47, A48 are inverted. For this reason, charges for detecting force components fx, fy, fz become positive as indicated in the sections encompassed by thick lines in the table of FIG. 39. Therefore, wiring becomes simple.

Figures 40, 41:
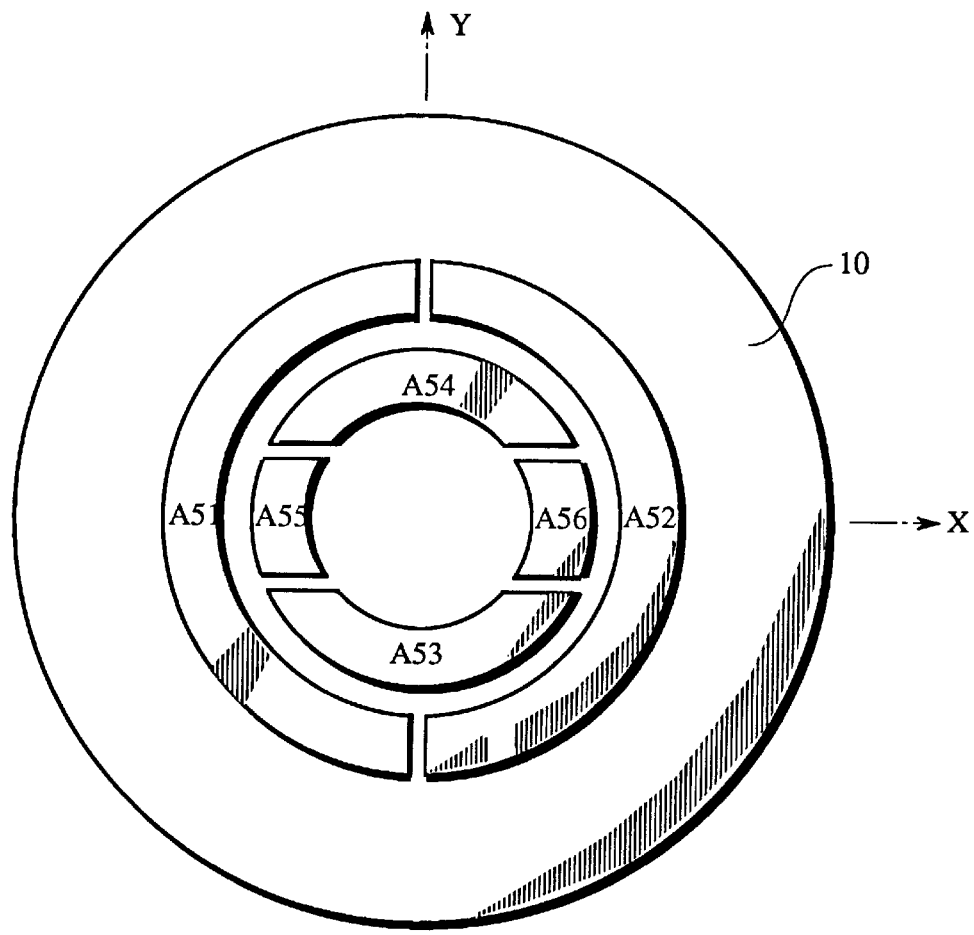
FIG. 40 is a top view of a sensor according to an embodiment using six upper electrodes.
FIG. 41 is a table showing polarity of charges produced in respective upper electrodes A51 to A56 when force components fx, fy, fz in respective axes directions caused by acceleration are applied to the sensor shown in FIG. 40.
Figures 42, 43:
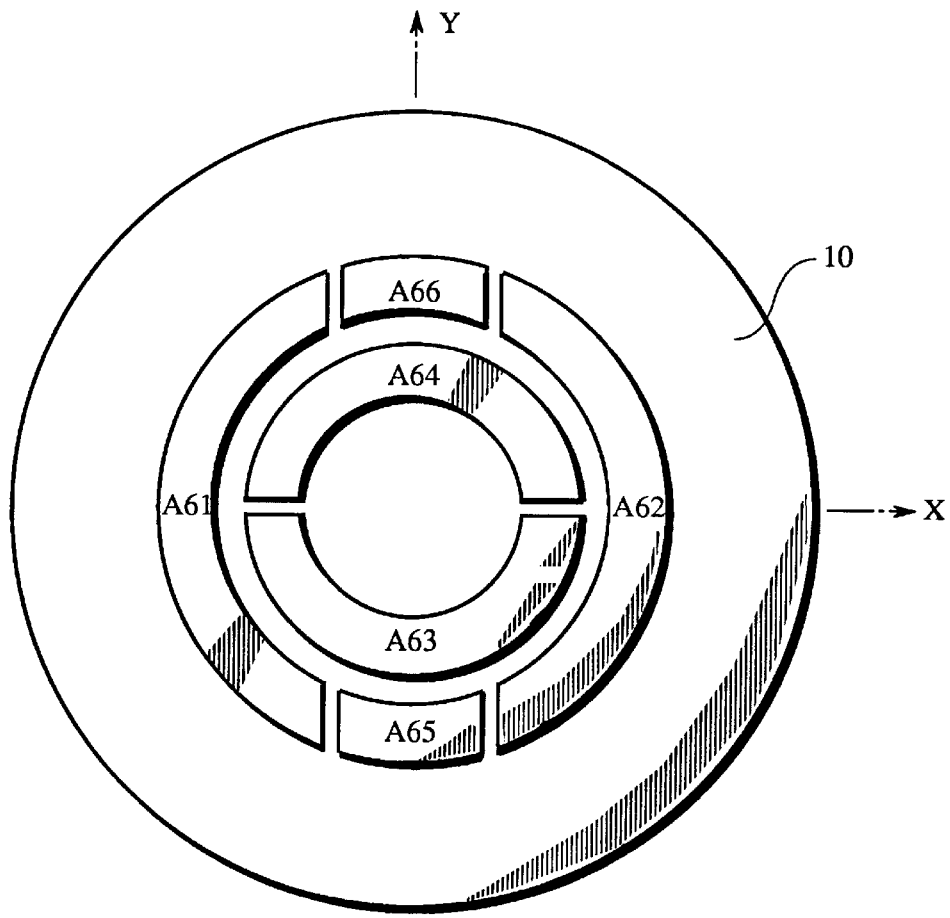
FIG. 42 is a top view of a sensor according to another embodiment using six upper electrodes.
FIG. 43 is a table showing polarity of charges produced in respective upper electrodes A61 to A66 when force components fx, fy, fz in respective axes directions caused by acceleration are applied to the sensor shown in FIG. 42.
Figures 44, 45:
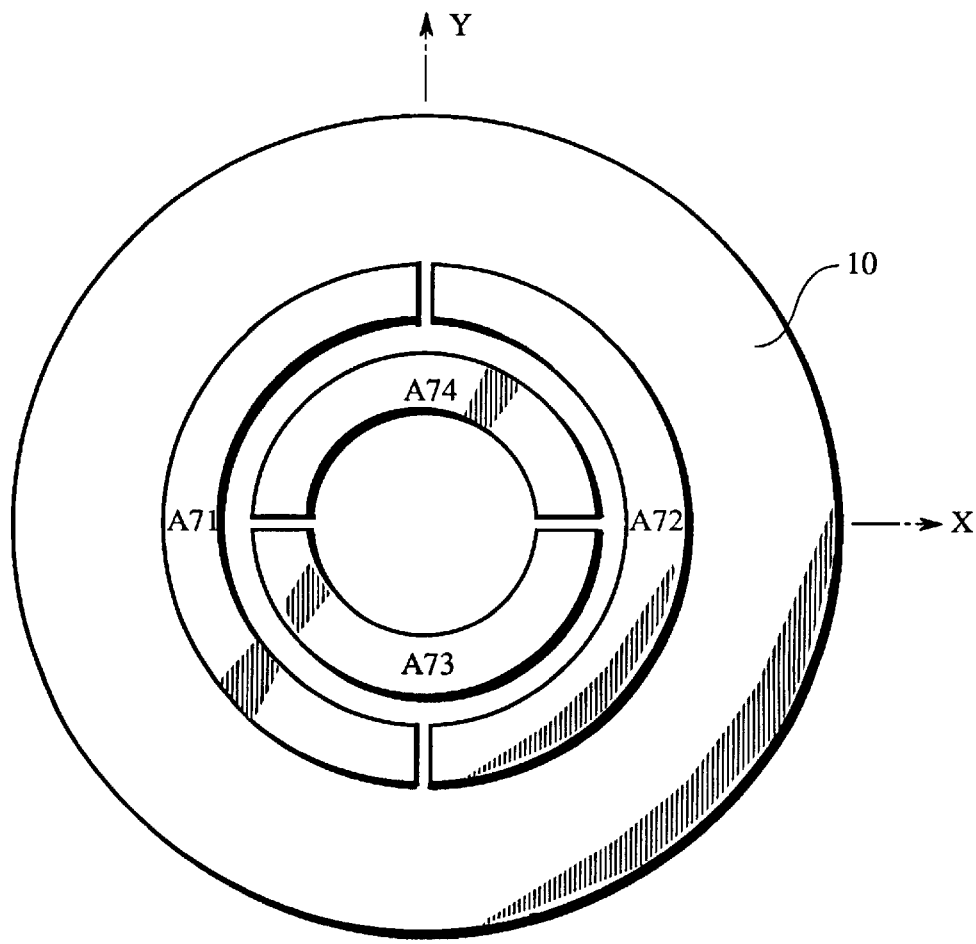
FIG. 44 is a top view of a sensor according to an embodiment using four upper electrodes.
FIG. 45 is a table showing polarity of charges produced in respective upper electrodes A71 to A74 when force components fx, fy, fz in respective axes direction caused by acceleration are applied to the sensor shown in FIG. 44.

FIG. 40 is a top view of an embodiment using six upper electrodes A51 to A56. In the above-described embodiment, the four upper electrodes A45 to A48 were used for detection of force fz. On the contrary, in this embodiment, detection of force fz is carried out by the two upper electrodes A55, A56. FIG. 41 is a table showing polarities of charges produced in the respective upper electrodes when force components fx, fy, fz are applied to the central portion 11 of this sensor. FIG. 42 is a top view of an embodiment using six upper electrodes A61 to A66. This embodiment slightly differs from the embodiment shown in FIG. 40 in an arrangement of the upper electrodes. FIG. 43 is a table showing polarities of charges produced in the respective upper electrodes when force components fx, fy, fz are applied to the central portion 11 of this sensor. Moreover, FIG. 44 is a top view of an embodiment using four upper electrodes A71 to A74, and FIG. 45 is a table showing polarities of charges produced in the respective upper electrodes when force components fx, fy, fz are applied to the central portion 11 of this sensor. Assuming that voltages produced across the upper electrodes A71 to A74 and the lower electrode are V71 to V74, respectively, force fx is obtained by detecting a voltage difference (V71−V72), force fy is obtained by detecting a voltage difference (V74−V73), and force fz is obtained by detecting a voltage value (V73+V74−V71−V72) corresponding to a difference between the sum voltage (V73+V74) and the sum voltage (V71+V72).

Of course, also in all of the above-described sensors, if polarization processing is implemented to a piezoelectric element, wiring can be simplified. While, in this chapter §13, it has been described that respective upper electrodes are caused to have only the function as "force detecting means" in respective axes directions, an approach may be employed to deliver charges to these respective upper electrodes in a manner opposite the above, thereby permitting them to have a function as "excitation means" in respective axes directions. This is exactly the same as the sensor of the embodiment shown in FIG. 8. Therefore, detection of angular velocity can be carried out together with detection of acceleration. Further, the upper electrode patterns shown in the embodiment which has been described in this chapter §13 can be all applied also to the sensor using a strain generative body which has been described in chapter §9.

While this invention has been described in accordance with several embodiments, this invention is not limited to these embodiments, but may be carried out in various modes in addition to the above. For example, if metal is used as a lower electrode and the thickness thereof is caused to be thicker, the mass of the portion functioning as an oscillator can be increased. For this reason, a higher sensitivity sensor can be realized. In addition, while physically a single lower electrode is used in all of the above-described embodiments, plural lower electrodes which perform the same function as above may be used. For example, five upper electrodes and five lower electrodes facing the respective upper electrodes can be used. Of course, if several embodiments which have been described until now are combined with each other, sensors in various forms suitable for use can be realized.

Industrial Applicability

As described above, in accordance with the sensor according to this invention, upper electrodes are disposed on an upper surface of a piezoelectric element and a lower electrode is disposed on a lower surface thereof and an a.c. voltage is applied across these electrodes as occasion demands to detect applied acceleration and Coriolis force as charges produced in these electrodes. For this reason, it is possible to detect both acceleration and angular velocity relating to multi-dimensional directions while having a simple structure suitable for miniaturization and mass-productivity. Such sensors can be widely utilized for transportation equipments such as a vehicle, ship or airplane, or devices for relating the movement state relating to multi-dimensional directions of industry equipment including movement of objects.

I claim:

1. An acceleration sensor for detecting acceleration components in plural coordinate axis directions in an XYZ three-dimensional coordinate system having an X-axis, a Y-axis and a Z-axis, comprising a piezoelectric element in a plate form, five upper electrodes formed on an upper surface of the piezoelectric element and at least one lower electrode formed at a position facing the respective upper electrodes on a lower surface of the piezoelectric element;

wherein an origin of the XYZ three-dimensional coordinate system is defined substantially at a central position of the upper surface of the piezoelectric element;

wherein the piezoelectric element extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions; and wherein the five upper electrodes are constituted as a first upper electrode formed in a negative region with respect to the X-axis, a second upper electrode formed in a positive region with respect to the X-axis, a third upper electrode formed in a negative region with respect to the Y-axis, a fourth upper electrode formed in a positive region with respect to the Y-axis and a fifth upper electrode formed in a region surrounding a periphery of the origin, at least each portion of these respective upper electrodes being located on the flexible portion;

said acceleration sensor further comprising;

force detecting means for detecting a force in a particular axis direction applied to the working portion on the basis of charges produced in the upper electrodes; and circuit means for outputting a detected value by the force detecting means with respect to the particular axis direction as an electric signal so as to carry out detection of acceleration in the particular axis direction.

2. An acceleration sensor according to claim 1, the sensor further comprising;

excitation means for applying an a.c. voltage across a predetermined pair of upper and lower electrodes to thereby oscillate the working portion in a first axis direction;

wherein the circuit means has a function to output a detected value by the force detecting means with respect to a second axis direction perpendicular to the first axis direction as an electric signal so as to carry out detection of an angular velocity about a third axis perpendicular to the first axis and the second axis;

thus making it possible to detect angular velocity components about plural coordinate axis along with acceleration components in plural coordinate axis directions.

3. An acceleration sensor according to claim 1, wherein an annular groove is formed in the lower surface of the piezoelectric element to surround a periphery of the origin, and provide a reduced thickness of said piezoelectric element at said annular groove which forms said flexible portion.

4. An acceleration sensor for detecting acceleration components in plural coordinate axis directions in an XYZ three-dimensional coordinate system having an X-axis, a Y-axis and a Z-axis, comprising piezoelectric element in a plate form, five upper electrodes formed on an upper surface of the piezoelectric element, at least one lower electrode formed at a position facing the respective upper electrodes on a lower surface of the piezoelectric element and a strain generative body in a plate form for supporting said at least one lower electrode from below;

wherein an origin of the XYZ three-dimensional coordinate system is defined substantially at a central position of an upper surface of the strain generative body;

wherein the strain generative body extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions;

wherein the upper surface of the strain generative body and a lower surface of said at least one lower electrode are fixed in such a state where a plate surface of the piezoelectric element is substantially in parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body; and wherein the five upper electrodes are constituted as a first upper electrode formed in a negative region with respect to the X-axis, a second upper electrode formed in a positive region with respect to the X-axis, a third upper electrode formed in a negative region with respect to the Y-axis, a fourth upper electrode formed in a positive region with respect to the Y-axis and a fifth upper electrode formed in a region surrounding a periphery of the origin, at least each portion of these respective upper electrodes being located on the flexible portion;

said acceleration sensor further comprising;

excitation means for applying an a.c. voltage across a predetermined pair of upper and lower electrodes to thereby oscillate the working portion;

force detecting means for detecting a force in an axis direction applied to the working portion on the basis of charges produced in the upper electrodes; and circuit means having a first function to output a detected value by the force detecting means with respect to a particular axis direction under the condition that the working portion is not oscillated thus to carry out detection of acceleration in said particular axis direction, and a second function to output a detected value by the force detecting means with respect to a first axis direction under the condition that the working portion is oscillated in a second axis direction perpendicular to the first axis direction thus to carry out detection of an angular velocity about a third axis perpendicular to the first axis and the second axis;

thus making it possible to detect angular velocity components about plural coordinate axes along with acceleration components in plural coordinate axes directions.

5. An acceleration sensor according to claim 4, wherein an annular groove is formed in the lower surface of the strain generative body to surround a periphery of the origin, and provide a reduced thickness of said strain generative body at said annular groove which forms said flexible portion.

6. An acceleration sensor for detecting acceleration components in plural coordinate axis directions in an XYZ three-dimensional coordinate system having an X-axis, a Y-axis and a Z-axis, comprising a piezoelectric element in a plate form, five upper electrodes formed on an upper surface of the piezoelectric element, and a strain generative body in a plate form for supporting the piezoelectric element from below, at least an upper surface portion of the strain generative body being constituted by conductive material so that a lower electrode facing the respective upper electrodes is constituted by the conductive material;

wherein an origin of the XYZ three-dimensional coordinate system is defined substantially at a central position of an upper surface of the strain generative body;

wherein the strain generative body extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions;

the upper surface of the strain generative body and a lower surface of the piezoelectric element are fixed in such a state where a plate surface of the piezoelectric element is substantially parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body; and wherein the five upper electrodes are constituted as a first upper electrode formed in a negative region with respect to the X-axis, a second upper electrode formed in a positive region with respect to the X-axis, a third upper electrode formed in a negative region with respect to the Y-axis, a fourth upper electrode formed in a positive region with respect to the Y-axis and a fifth upper electrode formed in a region surrounding a periphery of the origin, at least each portion of these respective upper electrodes being located on the flexible portion;

said acceleration sensor further comprising;

excitation means for applying an a.c. voltage across a predetermined pair of upper and lower electrodes to thereby oscillate the working portion;

force detecting means for detecting a force in an axis direction applied to the working portion on the basis of charges produced in the upper electrodes; and circuit means having a first function to output a detected value by the force detecting means with respect to a particular axis direction under the condition that the working portion is not oscillated thus to carry out detection of acceleration in said particular axis direction, and a second function to output a detected value by the force detecting means with respect to a first axis direction under the condition that the working portion is oscillated in a second axis direction perpendicular to the first axis direction thus to carry out detection of an angular velocity about a third axis perpendicular to the first axis and the second axis;

thus making it possible to detect angular velocity components about plural coordinate axes along with acceleration components in plural coordinate axis directions.

7. An acceleration sensor according to claim 6, wherein an annular groove is formed in the lower surface of the strain generative body to surround a periphery of the origin, and provide a reduced thickness of said strain generative body at said annular groove which forms said flexible portion.

8. An acceleration sensor according to claim 1, wherein an inside annular region to surround the origin from a periphery thereof and an outside annular 00 region to further surround the inside annular region from a periphery are defined on the XY plane;

wherein the first upper electrode is disposed in a region extending over the second quadrant and the third quadrant of the XY coordinate system within the outside annular region;

wherein the second upper electrode is disposed in a region extending over the first quadrant and the fourth quadrant of the XY coordinate system within the outside annular region;

wherein the third upper electrode is disposed in a region extending over the third quadrant and the fourth quadrant of the XY coordinate system within the outside annular region;

wherein the fourth upper electrode is disposed in a region extending over the first quadrant and the second quadrant of the XY coordinate system within the outside annular region; and wherein the fifth upper electrode is disposed within the inside annular region.

9. An acceleration sensor according to claim 4, wherein an inside annular region to surround the origin from a periphery thereof and an outside annular region to further surround the inside annular region from a periphery are defined on the XY plane;

wherein the first upper electrode is disposed in a region extending over the second quadrant and the third quadrant of the XY coordinate system within the outside annular region;

wherein the second upper electrode is disposed in a region extending over the first quadrant and the fourth quadrant of the XY coordinate system within the outside annular region;

wherein the third upper electrode is disposed in a region extending over the third quadrant and the fourth quadrant of the XY coordinate system within the outside annular region;

wherein the fourth upper electrode is disposed in a region extending over the first quadrant and the second quadrant of the XY coordinate system within the outside annular region; and wherein the fifth upper electrode is disposed within the inside annular region.

10. An acceleration sensor according to claim 6, wherein an inside annular region to surround the origin from a periphery thereof and an outside annular region to further surround the inside annular region from a periphery are defined on the XY plane;

wherein the first upper electrode is disposed in a region extending over the second quadrant and the third quadrant of the XY coordinate system within the outside annular region;

wherein the second upper electrode is disposed in a region extending over the first quadrant and the fourth quadrant of the XY coordinate system within the outside annular region;

wherein the third upper electrode is disposed in a region extending over the third quadrant and the fourth quadrant of the XY coordinate system within the outside annular region;

wherein the fourth upper electrode is disposed in a region extending over the first quadrant and the second quadrant of the XY coordinate system within the outside annular region; and wherein the fifth upper electrode is disposed within the inside annular region.

11. An acceleration sensor according to claim 1, wherein an inside annular region to surround the origin from a periphery thereof and an outside annular region to further surround the inside annular region from a periphery are defined on the XY plane;

wherein the first upper electrode is disposed in a region extending over the second quadrant and the third quadrant of the XY coordinate system within the inside annular region;

wherein the second upper electrode is disposed in a region extending over the first quadrant and the fourth quadrant of the XY coordinate system within the inside annular region;

wherein the third upper electrode is disposed in a region extending over the third quadrant and the fourth quadrant of the XY coordinate system within the inside annular region;

wherein the fourth upper electrode is disposed in a region extending over the-first quadrant and the second quadrant of the XY coordinate system within the inside annular region; and wherein the fifth upper electrode is disposed within the outside annular region.

12. An acceleration sensor according to claim 4, wherein an inside annular region to surround the origin from a periphery thereof and an outside annular region to further surround the inside annular region from a periphery are defined on the XY plane;

wherein the first upper electrode is disposed in a region extending over the second quadrant and the third quadrant of the XY coordinate system within the inside annular region;

wherein the second upper electrode is disposed in a region extending over the first quadrant and the fourth quadrant of the XY coordinate system within the inside annular region;

wherein the third upper electrode is disposed in a region extending over the third quadrant and the fourth quadrant of the XY coordinate system within the inside annular region;

wherein the fourth upper electrode is disposed in a region extending over the first quadrant and the second quadrant of the XY coordinate system within the inside annular region; and wherein the fifth upper electrode is disposed within the outside annular region.

13. An acceleration sensor according to claim 6, wherein an inside annular region to surround the origin from a periphery thereof and an outside annular region to further surround the inside annular region from a periphery are defined on the XY plane;

wherein the first upper electrode is disposed in a region extending over the second quadrant and the third quadrant of the XY coordinate system within the inside annular region;

wherein the second upper electrode is disposed in a region extending over the first quadrant and the fourth quadrant of the XY coordinate system within the inside annular region;

wherein the third upper electrode is disposed in a region extending over the third quadrant and the fourth quadrant of the XY coordinate system within the inside annular region;

wherein the fourth upper electrode is disposed in a region extending over the first quadrant and the second quadrant of the XY coordinate system within the inside annular region; and wherein the fifth upper electrode is disposed within the outside annular region.

14. An acceleration sensor according to claim 1, wherein polarization processing is carried out with respect to respective portions of the piezoelectric element;

so that polarization characteristics opposite each other are respectively obtained at a portion of the piezoelectric element where the first upper electrode is formed and a portion of the piezoelectric element where the second upper electrode is formed; and so that polarization characteristics opposite each other are respectively obtained at a portion of the piezoelectric element where the third upper electrode is formed and a portion of the piezoelectric element where the fourth electrode is formed.

15. An acceleration sensor according to claim 4, wherein polarization processing is carried out with respect to respective portions of the piezoelectric element;

so that polarization characteristics opposite each other are respectively obtained at a portion of the piezoelectric element where the first upper electrode is formed and a portion of the piezoelectric element where the second upper electrode is formed; and so that polarization characteristics opposite each other are respectively obtained at a portion of the piezoelectric element where the third upper electrode is formed and a portion of the piezoelectric element where the fourth electrode is formed.

16. An acceleration sensor according to claim 6, wherein polarization processing is carried out with respect to respective portions of the piezoelectric element;

so that polarization characteristics opposite each other are respectively obtained at a portion of the piezoelectric element where the first upper electrode is formed and a portion of the piezoelectric element where the second upper electrode is formed; and so that polarization characteristics opposite each other are respectively obtained at a portion of the piezoelectric element where the third upper electrode is formed and a portion of the piezoelectric element where the fourth electrode is formed.

17. An acceleration sensor according to claim 12, wherein said excitation means includes three coordinated excitation means including, X-axis direction excitation means for applying an a.c. voltage across the first upper and lower electrodes and across the second upper and lower electrodes to thereby oscillate the working portion in the X-axis direction, Y-axis direction excitation means for applying an a.c. voltage across the third upper and lower electrodes and across the fourth upper and lower electrodes to thereby oscillate the working portion in the Y-axis direction, and Z-axis direction excitation means for applying an a.c. voltage across the fifth upper and lower electrodes to thereby oscillate the working portion in the Z-axis direction; and wherein said force detecting means includes three coordinated force detecting means including, X-axis direction force detecting means for detecting a force in the X-axis direction applied to the working portion, on the basis of charges produced in the first upper electrode and charges produced in the second upper electrode, Y-axis direction force detecting means for detecting a force in the Y-axis direction applied to the working portion, on the basis of charges produced in the third upper electrode and charges produced in the fourth upper electrode, and Z-axis direction force detecting means for detecting a force in the Z-axis direction applied to the working portion, on the basis of charges produced in the fifth upper electrode.

18. An acceleration sensor according to claim 4, wherein said excitation means includes three coordinated excitation means including, X-axis direction excitation means for applying an a.c. voltage across the first upper and lower electrodes and across the second upper and lower electrodes to thereby oscillate the working portion in the X-axis direction, Y-axis direction excitation means for applying an a.c. voltage across the third upper and lower electrodes and across the fourth upper and lower electrodes to thereby oscillate the working portion in the Y-axis direction, and Z-axis direction excitation means for applying an a.c. voltage across the fifth upper and lower electrodes to thereby oscillate the working portion in the Z-axis direction; and wherein said force detecting means includes three coordinated force detecting means including, X-axis direction force detecting means for detecting a force in the X-axis direction applied to the working portion, on the basis of charges produced in the first upper electrode and charges produced in the second upper electrode, Y-axis direction force detecting means for detecting a force in the Y-axis direction applied to the working portion, on the basis of charges produced in the third upper electrode and charges produced in the fourth upper electrode, and Z-axis direction force detecting means for detecting a force in the Z-axis direction applied to the working portion, on the basis of charges produced in the fifth upper electrode.

19. An acceleration sensor according to claim 6, wherein said excitation means includes three coordinated excitation means including, X-axis direction excitation means for applying an a.c. voltage across the first upper and lower electrodes and across the second upper and lower electrodes to thereby oscillate the working portion in the X-axis direction, Y-axis direction excitation means for applying an a.c. voltage across the third upper and lower electrodes and across the fourth upper and lower electrodes to thereby oscillate the working portion in the Y-axis direction, and Z-axis direction excitation means for applying an a.c. voltage across the fifth upper and lower electrodes to thereby oscillate the working portion in the Z-axis direction; and wherein said force detecting means includes three coordinated force detecting means including, X-axis direction force detecting means for detecting a force in the X-axis direction applied to the working portion, on the basis of charges produced in the first upper electrode and charges produced in the second upper electrode, Y-axis direction force detecting means for detecting a force in the Y-axis direction applied to the working portion, on the basis of charges-produced in the third upper electrode and charges produced in the fourth upper electrode, and Z-axis direction force detecting means for detecting a force in the Z-axis direction applied to the working portion, on the basis of charges produced in the fifth upper electrode.

20. An acceleration sensor for detecting acceleration components in plural coordinate axis directions in an XYZ three-dimensional coordinate system having an X-axis, a Y-axis and a Z-axis, comprising a piezoelectric element in a plate form, five upper electrodes formed on an upper surface of the piezoelectric element and at least one lower electrode formed at a position facing the respective upper electrodes on a lower surface of the piezoelectric element;

wherein an origin of the XYZ three-dimensional coordinate system is defined substantially at a central position of the upper surface of the piezoelectric element;

wherein the piezoelectric element extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions; and wherein the five upper electrodes are constituted as a first upper electrode disposed in the first quadrant of the XY coordinate system, a second upper electrode disposed in the second quadrant thereof, a third upper electrode disposed in the third quadrant thereof, a fourth upper electrode disposed in the fourth quadrant thereof and a fifth upper electrode disposed in a peripheral region of the origin, at least each portion of these respective upper electrodes being located on the flexible portion;

said acceleration sensor further comprising;

force detecting means for detecting a force in a particular axis direction applied to the working portion on the basis of charges produced in the upper electrodes; and circuit means for outputting a detected value by the force detecting means with respect to the particular axis direction as an electric signal so as to carry out detection of acceleration in the particular axis direction.

21. An acceleration sensor for detecting acceleration components in plural coordinate axis directions in an XYZ three-dimensional coordinate system having an X-axis, a Y-axis and a Z-axis, comprising a piezoelectric element in a plate form, five upper electrodes formed on an upper surface of the piezoelectric element, at least one lower electrode formed at a position facing the respective upper electrodes on a lower surface of the piezoelectric element and a strain generative body in a plate form for supporting said at least one lower electrode from below;

wherein an origin of the XYZ three-dimensional coordinate system is defined substantially at a central position of an upper surface of the strain generative body;

wherein the strain generative body extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions;

wherein the upper surface of the strain generative body and a lower surface of said at least one lower electrode are fixed in such a state where a plate surface of the piezoelectric element is substantially parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body; and wherein the five upper electrodes are constituted as a first upper electrode disposed in the first quadrant of the XY coordinate system, a second upper electrode disposed in the second quadrant thereof, a third upper electrode disposed in the third quadrant thereof, a fourth upper electrode disposed in the fourth quadrant thereof and a fifth upper electrode disposed in a peripheral region of the origin, at least each portion of these respective upper electrodes being located on the flexible portion;

said acceleration sensor further comprising;

excitation means for applying an a.c. voltage across a predetermined pair of upper and lower electrodes to thereby oscillate the working portion;

force detecting means for detecting a force in an axis direction applied to the working portion on the basis of charges produced in the upper electrodes; and circuit means having a first function to output a detected value by the force detecting means with respect to a particular axis direction under the condition that the working portion is not oscillated thus to carry out detection of acceleration in said particular axis direction, and a second function to output a detected value by the force detecting means with respect to a first axis direction under the condition that the working portion is oscillated in a second axis direction perpendicular to the first axis direction thus to carry out detection of an angular velocity about a third axis perpendicular to the first axis and the second axis;

thus making it possible to detect angular velocity components about plural coordinate axes along with acceleration components in plural coordinate axis directions.

22. An acceleration sensor for detecting acceleration components in plural coordinate axis directions in an XYZ three-dimensional coordinate system having an X-axis, a Y-axis and a Z-axis, comprising a piezoelectric element in a plate form, five upper electrodes formed on an upper surface of the piezoelectric element, and a strain generative body in a plate form for supporting the piezoelectric element from below, at least an upper surface portion of the strain generative body being constituted by conductive material so that a lower electrode facing the respective upper electrodes is constituted by the conductive material;

wherein an origin of the XYZ three-dimensional coordinate system is defined substantially at a central position of an upper surface of the strain generative body;

wherein the strain generative body extends along an XY plane and includes a central portion around the origin, a flexible portion with flexibility surrounding the central portion and a peripheral portion surrounding the flexible portion, so that said central portion and said peripheral portion are caused to undergo displacement relative to each other by bending of the flexible portion;

wherein either one of the central portion and the peripheral portion is fixed to a sensor casing as a fixed portion, and the other is supported as a working portion in a state to be displaced by force applied in respective coordinate axis directions;

the upper surface of the strain generative body and a lower surface of the piezoelectric element are fixed in such a state where a plate surface of the piezoelectric element is substantially parallel to a plate surface of the strain generative body so that when bending takes place in the flexible portion of the strain generative body, said bending is transmitted to the piezoelectric element, while when bending takes place in the piezoelectric element, said bending is transmitted to the flexible portion of the strain generative body; and wherein the five upper electrodes are constituted as a first upper electrode disposed in the first quadrant of the XY coordinate system, a second upper electrode disposed in the second quadrant thereof, a third upper electrode disposed in the third quadrant thereof, a fourth upper electrode disposed in the fourth quadrant thereof and a fifth upper electrode disposed in a peripheral region of the origin, at least each portion of these respective upper electrodes being located on the flexible portion;

said acceleration sensor further comprising;

excitation means for applying an a.c. voltage across a predetermined pair of upper and lower electrodes to thereby oscillate the working portion;

force detecting means for detecting a force in an axis direction applied to the working portion on the basis of charges produced in the upper electrodes; and circuit means having a first function to output a detected value by the force detecting means with respect to a particular axis direction under the condition that the working portion is not oscillated thus to carry out detection of acceleration in said particular axis direction, and a second function to output a detected value by the force detecting means with respect to a first axis direction under the condition that the working portion is oscillated in a second axis direction perpendicular to the first axis direction thus to carry out detection of an angular velocity about a third axis perpendicular to the first axis and the second axis;

thus making it possible to detect angular velocity components about plural coordinate axes along with acclearation components in plural coordinate axis directions.

* * * * *